United States Patent [19]

Sasada et al.

[11] Patent Number: 5,542,304
[45] Date of Patent: Aug. 6, 1996

[54] MAGNETOSTRICTIVE TORQUE SENSOR, MAGNETOSTRICTIVE TORQUE MEASURING APPARATUS, AND CONDITION-MONITORING APPARATUS FOR A CUTTING TOOL USING THE SAME

[75] Inventors: Ichiro Sasada, Fukuoka; Akihiko Morikawa, Kyoto, both of Japan

[73] Assignee: OMRON Corporation, Kyoto, Japan

[21] Appl. No.: 332,522

[22] Filed: Oct. 31, 1994

[30] Foreign Application Priority Data

Oct. 29, 1993 [JP] Japan .................................. 5-292402
Mar. 7, 1994 [JP] Japan .................................. 6-064634

[51] Int. Cl.⁶ .................................................. G02L 3/02
[52] U.S. Cl. .......................... 73/862.333; 73/862.06
[58] Field of Search ............................ 73/104, 862.06, 73/862.321, 862.333, DIG. 2; 324/207.13, 209

[56] References Cited

U.S. PATENT DOCUMENTS

| | | | |
|---|---|---|---|
| 2,477,457 | 7/1949 | Hughes | 73/862.06 |
| 2,829,516 | 4/1958 | Chiesorin | 73/862.06 |
| 2,912,642 | 11/1959 | Dahle | 73/862.333 X |
| 3,866,462 | 2/1975 | Fraudin | 73/DIG. 2 X |
| 4,566,338 | 1/1986 | Fleming et al. | 73/862.333 |
| 4,646,576 | 3/1987 | Kita | 73/862.333 |
| 4,716,773 | 1/1988 | Nonomura et al. | 73/862.333 |
| 4,741,231 | 5/1988 | Patterson et al. | 73/862.333 |
| 4,875,365 | 10/1989 | Powell et al. | 73/862.06 X |
| 4,884,461 | 12/1989 | Sawicki et al. | 73/862.06 |
| 4,899,594 | 2/1990 | Wolfer et al. | 73/862.06 |
| 4,924,713 | 4/1990 | Machino et al. | 73/862.06 |
| 5,412,999 | 5/1995 | Vigmostad et al. | 73/862.333 |

FOREIGN PATENT DOCUMENTS 1110021  5/1986  Japan .................................. 73/862.333

*Primary Examiner*—Richard Chilcot
*Assistant Examiner*—Elizabeth L. Dougherty
*Attorney, Agent, or Firm*—Foley & Lardner

[57] ABSTRACT

A high-permeability core has four legs of a quadrangular prism shape. An exciting coil has a first winding that is wound on two adjacent legs of the core, and a second winding connected to the first winding and wound on the other two adjacent legs in the direction opposite to the winding direction of the first winding. A detecting coil has a structure similar to that of the exciting coil, and oriented orthogonally thereto. The sensor is disposed adjacent to a rotary shaft such that a long side of each winding of the exciting coil is parallel to the axial direction of the rotary shaft. The core is-produced by forming a cruciform groove in a rectangular parallelepiped core block from one face.

14 Claims, 17 Drawing Sheets

| OUTPUT OF SEARCH COIL | ZERO-POINT CORRECTION VALUE |
|---|---|
| $X_1$ $X_2$ $X_3$ ⋮ | $Y_1$ $Y_2$ $Y_3$ ⋮ |

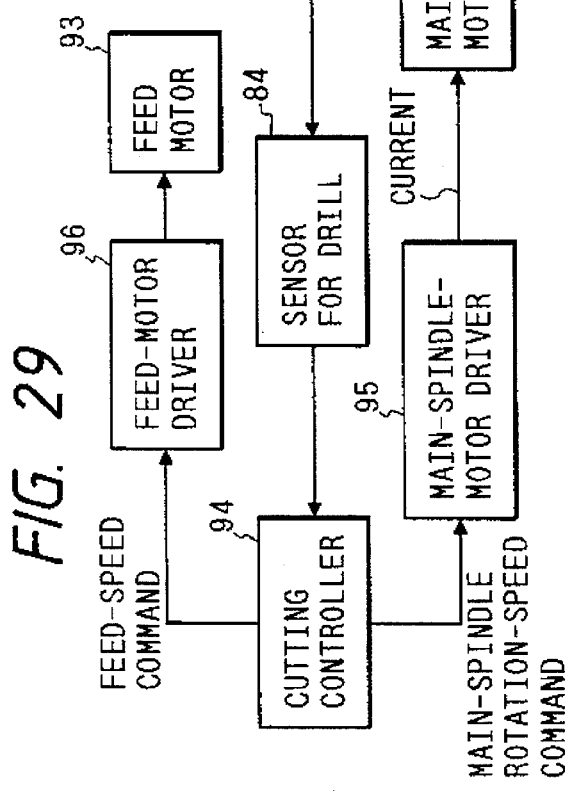

MAGNETOSTRICTIVE TORQUE SENSOR, MAGNETOSTRICTIVE TORQUE MEASURING APPARATUS, AND CONDITION-MONITORING APPARATUS FOR A CUTTING TOOL USING THE SAME

BACKGROUND OF THE INVENTION

The present invention relates to a magnetostrictive torque sensor and a magnetostrictive torque measuring apparatus, as well as to a condition-monitoring apparatus for a cutting tool.

A magnetostrictive stress (torque) sensor makes use of a phenomenon in which magnetic permeability changes when a mechanical strain is imparted to a ferromagnetic material, the phenomenon being one of the phenomena of magnetic strain. The magnetostrictive torque sensor is arranged such that a rotary shaft for the detection of torque is formed by a ferromagnetic material such as iron, and two U-shaped coils (each arranged by winding a coil around open-side opposite legs of a U-shaped core), which form a bridge in such a manner as to oppose side surfaces of the shaft member, are disposed in a crossing manner.

Further, one core is disposed parallel to the axial direction of the rotary shaft, and the other core is disposed in a direction perpendicular to the axial direction. In other words, the legs of the two cores are positioned at vertices of a square, but the sides of the square are positioned in such a manner as to be inclined 45 degrees with respect to the axial direction of the rotary shaft.

If torque is applied to the rotary shaft in this state, the rotary shaft is twisted and a tensile stress and a compressive stress occur in a direction offset ±45 degrees with respect to the center line of the shaft. As a result, the magnetic permeability at the rotary shaft changes. With respect to the change of permeability, an a.c. current is allowed to flow across one of the two U-shaped coils to excite it, and a signal is fetched from the other coil, so as to detect the change in permeability and determine the torque on the basis of the result of detection thereof.

With the above-described conventional sensor, however, the following problems are encountered. Namely, the magnetic pole portions have a magnetic path which include an open end of the exciting core, the interior of the shaft subject to measurement, an open end of the detecting core, the interior of the detecting core, the other open end of the detecting core, the interior of the shaft subject to measurement, and the other open end of the exciting core. Since the exciting core and the detecting core are arranged in a crossing state, there are two systems of the aforementioned magnetic path, and the torque is detected as the magnetic permeability in the respective magnetic paths changes differentially with respect to the direction of the torque applied to the shaft subject to measurement.

However, the magnetic path passing through the interior of the shaft subject to measurement between the open end of the exciting core and the open end of the detecting core is present at four different positions. Accordingly, the permeability at sites which are adjacent to each other but vary in position is inevitably measured. Since the permeability in the shaft to be measured is nonuniform, large zero-point fluctuations occur as the consequence of the rotation of the shaft.

Moreover, in accordance with this system, it is possible to detect a torque in a certain direction with good sensitivity, but the detection sensitivity with respect to a torque by which the shaft is twisted in the opposite direction is low. Accordingly, in order to increase both detection sensitivities of torque in the two directions, it is necessary to provide two sensors of the above-described arrangement, and dispose them at axially different positions. Hence, the aforementioned problem (the zero-point fluctuations and the like as the consequence of the rotation of the shaft) become more noticeable, and the apparatus becomes large in size.

In addition, the magnetic pole which is formed by each coil becomes the open end face of each core, so that there occurs the problem that the area of magnetic pole is small and the sensitivity becomes low.

SUMMARY OF THE INVENTION

The present invention has been devised in view of the above-described background, and its object is to provide a magnetostrictive torque sensor and a magnetostrictive torque measuring apparatus which have high detection sensitivity, are capable of detecting torques occurring in two mutually perpendicular directions at the same place, and are capable of measuring torque with high accuracy by performing predetermined correction processing even if there is unevenness in the fitting of the coils and in the accuracy of mounting the sensor with respect to the object to be measured. Another object of the invention is to provide a condition-monitoring apparatus for a cutting tool which, by using the torque sensor and the like for attaining the above object, is capable of accurately detecting torque applied to a cutting tool with a compact and simple arrangement, and of detecting the condition of the cutting tool, including the presence or absence of breakage of the cutting tool, estimation of breakage thereof, wear and the like thereof.

To attain the above object, the magnetostrictive torque sensor in accordance with the present invention comprises: an exciting coil formed substantially into a figure of eight by means of a first winding and a second winding which are wound in mutually opposite directions; a detecting coil having substantially the same shape as the exciting coil; and a core having four pillar-shaped core elements for fitting the two coils; wherein a direction in which the first and second windings constituting the exciting coil are oriented and a direction in which a first winding and a second winding of the detecting coil are oriented are arranged one above the other in a mutually perpendicular state, the windings of each of the coils are wound around predetermined two adjacent core elements among the four core elements, and a direction in which the two adjacent core elements are arranged is made parallel or perpendicular to an axial direction of a rotary body subject to measurement.

Preferably, when the two coils are fitted around the core elements, the exciting coil is disposed on an open side of the core elements. More preferably, at that time, the exciting coil and the detecting coil are disposed by being spaced apart from each other by a predetermined distance along the axial direction of the core elements. Furthermore, the core used is desirably formed integrally as a cruciform groove is formed in one surface of a block member of a predetermined shape, since the fabrication is facilitated.

As other means for solving the problems to attain the above object, an arrangement is provided such that the first to fourth exciting windings constituting an exciting coil are arranged at vertices of a phantom square, and are connected such that electric current flows across two adjacent ones of the exciting windings in the same direction, while electric current in a direction opposite thereto flows across remaining two exciting windings. Then, first to fourth detecting windings constituting a detecting coil are disposed in such a manner as to be superposed over the first to fourth exciting windings. Further, a direction in which a pair of exciting windings across which the electric current flows in the same direction may be made parallel or perpendicular to an axial direction of a rotary body subject to measurement.

In such a case, it is preferable to provide a core having four pillar-shaped core elements, such that the exciting windings and the detecting windings are fitted around the core elements.

It is more preferable to provide a search coil for measuring a total amount of magnetic flux which is generated by the exciting coil, so as to correct an output of the detecting coil by using an output of the search coil.

In addition, the magnetostrictive torque measuring apparatus in accordance with the invention comprises: the magnetostrictive torque sensor with the search coil having the above-described arrangement; storage means for storing zero-point correction value data which is generated on the basis of outputs of the search coil and the detecting coil obtained when the rotary body subject to torque detection is rotated with no torque applied thereto; and correcting means for reading a zero-point correction value stored in the storage means on the basis of the output of the search coil when torque is applied to the rotary body, and for correcting the output of the detecting coil on the basis of the read zero-point correction value.

Furthermore, the condition-monitoring apparatus for a cutting tool in accordance with the invention comprises: a magnetostrictive torque sensor or a magnetostrictive torque measuring apparatus of any one of the above-described arrangements which is disposed on an outer side of a shank portion of a cutting tool detachably mounted on a machine tool body or a main spindle rotating together with the cutting tool, with a predetermined relationship of relative position with its axial direction; judging means for judging prescribed conditions of the cutting tool, including the presence or absence of breakage of the cutting tool detachably mounted on the machine tool body, prediction of breakage thereof, wear, and the like upon receipt of an output of the magnetostrictive torque sensor or the measuring apparatus; and control-signal generating means for outputting a predetermined control signal such as a speed reduction command to a driver with the cutting tool mounted thereon upon receipt of a result of determination by the determining means.

In the invention (first embodiment), a predetermined a.c. current is allowed to flow across the exciting coil, whereupon a magnetic flux is generated from one of the windings of the exciting coil toward the other winding. Then, the magnetic flux is concentrated in each core element of the core having small magnetic resistance. Since the magnetic flux passes through a path having small magnetic resistance, if no torque is being applied to the rotary shaft, the magnetic flux advances straightly from one core element toward the other core element, i.e., in a direction parallel or perpendicular to the axis. Then, since the exciting coil and the detecting coil are disposed perpendicularly to each other, the magnetic flux does not cross the windings of the detecting coil, so that an induced electromotive force is not generated on the detecting coil side.

Meanwhile, if a predetermined torque T is applied to the rotary shaft, stress is applied along a direction offset ±45 degrees with respect to the axial direction. Then, the magnetic permeability at this portion changes due to the counter magnetostrictive effect. Accordingly, since the magnetic flux becomes liable to pass in a direction offset 45 degrees with respect to the axial direction, the generated magnetic flux advances diagonally, and crosses each winding of the detecting coil, thereby generating an induced electromagnetic force. The greater the torque, the greater the electromotive force becomes.

Furthermore, since the exciting and detecting coils are fitted around a core (core elements) formed of a material having high magnetic permeability, even if the number of turns of each winding and the exciting current are small, the generated magnetic flux becomes large, and the crossing magnetic flux which crosses the coils at the time of application of torque becomes large. Hence, the sensor becomes a high-sensitivity sensor.

In addition, in the invention (second embodiment), the basic arrangements are similar to those described above. When no torque is being applied, if a predetermined a.c. current is allowed to flow across the exciting coil, the magnetic flux flowing out from one pair of exciting windings advances straightly toward the other pair of core elements adjacent thereto, i.e., in a direction parallel or perpendicular to the axis. Magnetic fluxes which are generated by the respective exciting windings are equal, so that induced electromotive forces generated by the respective detecting windings constituting the detecting coil also become equal.

Meanwhile, if the predetermined torque T is applied to the rotary shaft, stress is applied along a direction offset ±45 degrees with respect to the axial direction as described above, so that the magnetic flux becomes liable to pass in the direction offset ±45 degrees with respect to the axial direction. Accordingly, the generated magnetic flux advances diagonally, and the induced electromotive force at the detecting winding located in the diagonal direction increases. The greater the torque, the greater the increase becomes. Accordingly, it is possible to ascertain the presence or absence of the torque and the direction thereof by monitoring the state of the induced electromotive force at each detecting winding.

Furthermore, in the torque sensor and the measuring apparatus using the search coil, the output of the search coil becomes fixed irrespective of the magnitude of the torque. Therefore, a predetermined a.c. signal is applied to the exciting coil, and the object to be measured (rotary body) is rotated with no torque applied thereto. The output of the detecting coil at that time is ascribable to variations in the characteristics between the windings constituting each coil as well as a gap therebetween, and this output serves as an offset value, i.e., a zero-point correction value. Further, the output of the detecting coil at this time basically (as a general rule) corresponds one-to-one with the output of the search coil. Therefore, a table in which the two outputs are paired is prepared, and is stored in the storage means. In an actual measurement in a state in which torque is applied to the rotary body, outputs of the detecting coil and the search coil are extracted simultaneously, and the storage means is accessed on the basis of the output of the search coil, so as to read a corresponding zero-point correction value. Then, by subtracting the read zero-point correction value from the output of the detecting coil, it is possible to determine a real output of the detecting coil which corresponds to the magnitude of the torque. Subsequently, the torque is calculated from the output (after correction) by using a usual method.

In addition, in the condition-monitoring apparatus for a cutting tool in accordance with the invention, the condition of the cutting tool is detected by detecting the torque being applied to the cutting tool. Namely, in the event that the cutting tool becomes broken, the load ceases and the torque declines suddenly. Additionally, the torque increases immediately before the cutting tool breaks. If the processing face at the tip of the tool becomes worn, contact resistance between the tool and the object to be cut becomes large, so that the torque increases in this case as well. Therefore, the present condition of the cutting tool is determined on the basis of the output of the torque sensor, and the control-signal generating means outputs a predetermined control signal to the driver for driving the drill, as necessary, so as to lower the number of revolutions and a lowering speed, or stop and reverse the rotation of the drill, thereby securing stable operation.

BRIEF DESCRIPTION OF THE DRAWINGS

FIG. 29 is a block diagram showing a condition-monitoring apparatus for a cutting tool according to another embodiment of the invention; and FIG. 30 is a block diagram showing the main part of a cutting controller shown in FIG. 29.

DESCRIPTION OF THE PREFERRED EMBODIMENTS

Figure 1A:
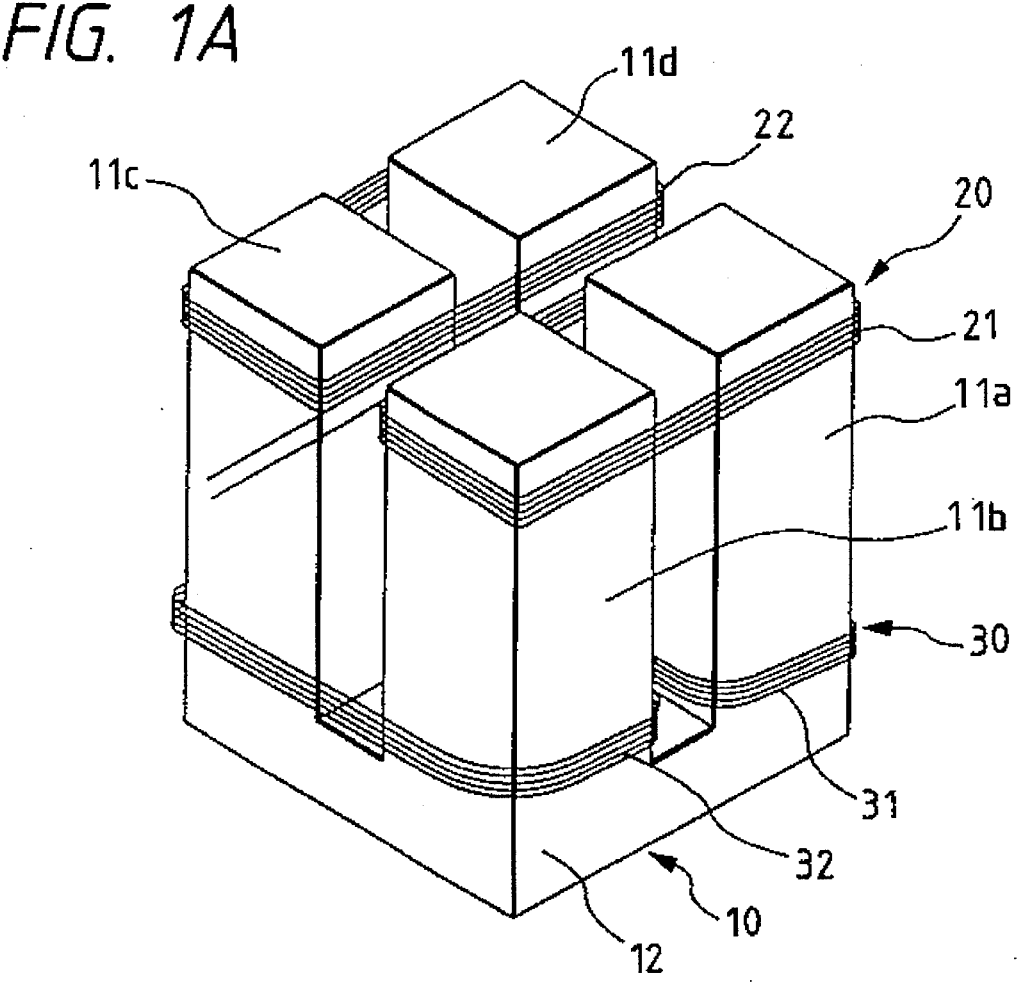
FIGS. 1A and 1B illustrate a magnetostrictive torque sensor according to an embodiment of the present invention.
Figure 1B:
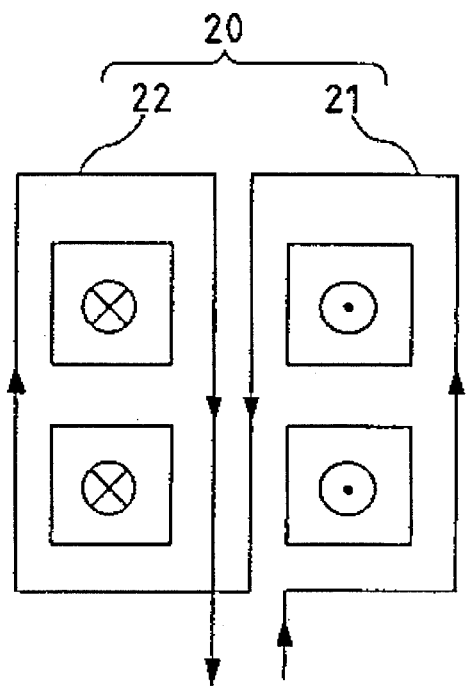

Referring now to the accompanying drawings, a description will be given of preferred embodiments of a magnetostrictive torque sensor in accordance with the present invention. As shown in FIGS. 1A and 1B, an exciting coil 20 and a detecting coil 30 which have the same shape are disposed around a core 10, which has high magnetic permeability such as ferrite and is provided with legs 11a to 11d constituting four core elements which each have the shape of a quadrangular prism and are arranged on vertices of a square, the exciting coil 20 and the detecting coil 30 being arranged one above the other 90 degrees offset from each other in terms of their relationships of relative position.

The exciting coil 20 has first and second windings 21 and 22 wound in opposite directions by a predetermined identical number of turns, the first winding 21 being wound around the legs 11a and 11b and the second winding 22 being wound around the legs 11c and 11d. As a result, both windings 21 and 22 are substantially rectangular in their planar shapes, and the directions in which they are disposed are parallel. Consequently, if current is allowed to flow across the exciting coil 20 from the first winding 21 side, the current flows across each winding in the direction as shown in FIG. 1B.

Similarly, the detecting coil 30 has a first winding 31 which is wound around the legs 11a and 11d of the core 10 by a predetermined number of turns, and a second winding 32 which is wound around the legs 11b and 11c by a predetermined number of turns in a direction opposite to the winding direction of the first winding. Both of these windings 31 and 32 are also substantially rectangular in their planar shapes, and the directions in which are disposed are parallel.

Consequently, the direction in which the exciting coil 20 is disposed and the direction in which the detecting coil 30 is disposed become perpendicular to each other. In addition, the coils 20 and 30 are each formed by winding one wire in a predetermined direction. Incidentally, as for the method of forming the windings, after one winding (e.g., the first winding 21 or 31) is wound by a predetermined number of turns, the other winding (e.g., the second winding 22 or 32) may be wound in the opposite direction by an identical number of turns, or both windings may be wound alternately. Thus, the winding method is arbitrary.

Further, in this embodiment, the exciting coil 20 is disposed on the open side of the legs 11a to 11d, and is positioned at the open-side distal ends thereof. Meanwhile, the detecting coil 30 is positioned on the proximal-end side of the legs 11a to 11d. Consequently, the distance by which both coils 20 and 30 are spaced apart from each other in the axial direction of the legs becomes long. It should be noted that, in the present invention, the coils 20 and 30 need not necessarily be disposed in such an order, and may be disposed in the reverse order (the detecting coil 30 is disposed on the open side of the legs 11a to 11d). In addition, both coils 20 and 30 may be disposed in proximity to each other in whichever arrangement.

In addition, to fabricate the core 10 having the above-described predetermined shape, the core 10 can be formed simply by producing a rectangular parallelepiped block, and then by cutting a cruciform groove in one surface thereof by cutting work.

Figure 2:
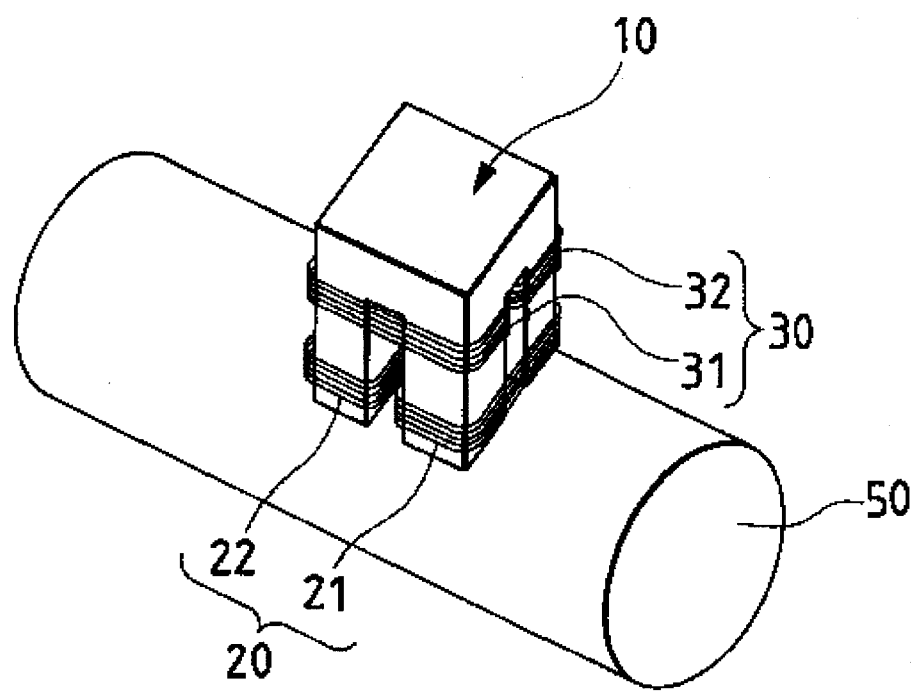
FIG. 2 is a perspective view showing how the torque sensor of FIG. 1 is used.

Then, to mount the sensor having the above-described configuration, as shown in FIG. 2, the sensor is disposed in close proximity to a side of a rotary shaft 50 in face-to-face relation thereto, the rotary shaft 50 being formed of a magnetic material. At this time, the sensor is disposed such that the direction in which a long side of each of the windings 21 and 22 of the exciting coil 20 is perpendicular to the axial direction of the rotary shaft 50, and the direction in which a long side of each of the windings 31 and 32 of the detecting coil 30 is parallel to the axial direction of the rotary shaft 50. Incidentally, the positional relation in this arrangement may be reversed (the direction in which the long side of each of the windings 21 and 22 of the exciting coil 20 is parallel to the axial direction of the rotary shaft 50).

Figure 3:
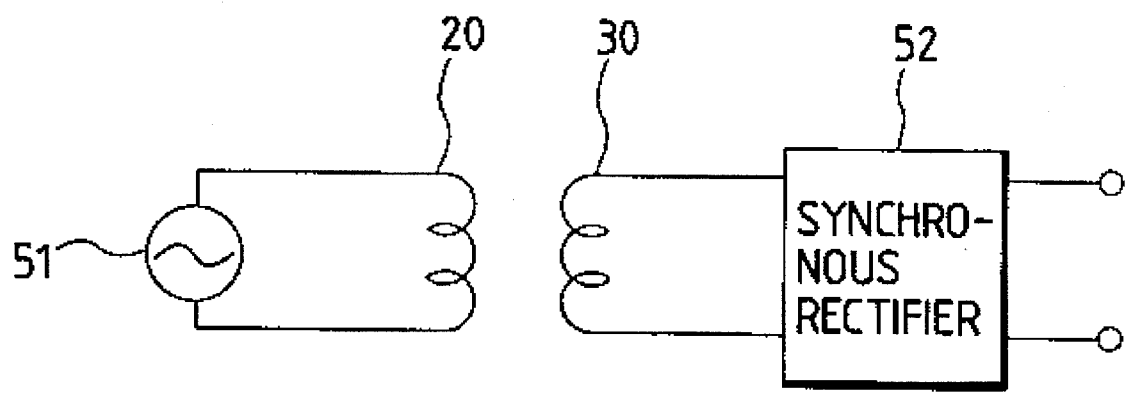
FIG. 3 shows a measuring system.

Then, as shown in FIG. 3, the exciting coil 20 is connected to an a.c. power supply 51 to allow an a.c. signal (exciting current) to be supplied thereto. In addition, a synchronous rectifier 52 is connected to both terminals of the detecting coil 30, thereby making it possible to detect an output voltage.

Here, a description will be given of the basic principle of detection (operation) by the torque sensor. First, if a predetermined a.c. current is allowed to flow across the exciting coil 20 by using the a.c. power supply 51, a magnetic flux is concurrently generated from one winding (e.g. the first winding 21) to the other winding (e.g., the second winding 22) of the exciting coil 20. Then, the magnetic flux is generated around the legs 11a to 11d of the core 10 having small magnetic resistance.

Figure 4A:
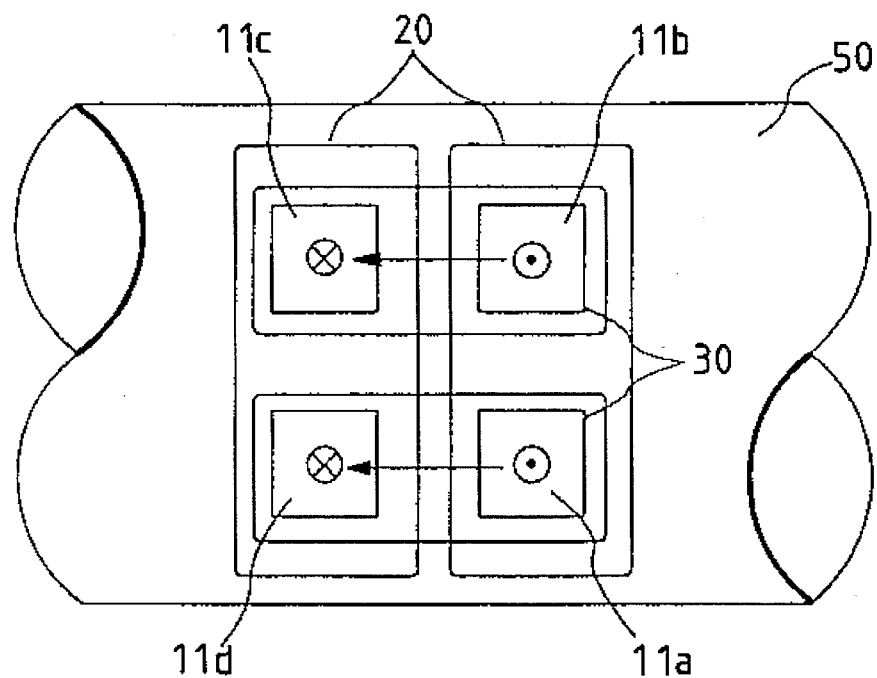
FIGS. 4A and 4B illustrate a principle of operation.

At this time, as for the magnetic field generated by the current flowing across the exciting coil 20, since the magnetic flux flows through a path having small magnetic resistance, if no torque is being applied to the rotary shaft 50, at a given time the magnetic flux, which has flowed out from the leg 11a, passes through the rotary shaft 50 having the small magnetic resistance, and moves along the axial direction of the rotary shaft 50 so as to enter the leg 11d located at a short distance from the leg 11a, as shown in FIG. 4A. Similarly, a magnetic flux which has flowed out from the leg 11b moves in the rotary shaft 50 along the axial direction, and enters the leg 11c. Incidentally, although an illustration is omitted, since the exciting current which is supplied to the exciting coil 20 is an a.c. signal, if the direction of flow of the current is reversed, the direction of each magnetic flux is also reversed.

Since these magnetic fluxes do not respectively cross the windings 31 and 32 of the detecting coil 30, an induced electromotive force is not generated on the detecting coil 30 side. Accordingly, an output of the synchronous rectifier 52 becomes zero.

Figure 4B:
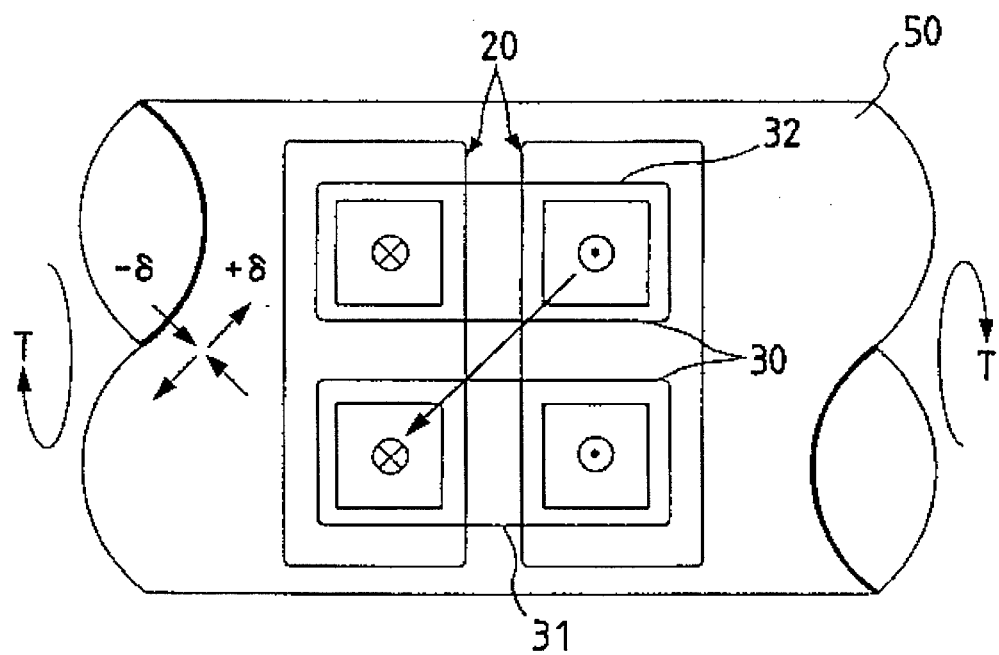

Meanwhile, as shown in FIG. 4B, if a predetermined torque T is applied to the rotary shaft 50, stress is applied along a direction offset ±45 degrees with respect to the axial direction (±σ indicated by bidirectional arrows in the drawing). Then, the magnetic permeability at this portion changes due to a counter magnetostrictive effect. The greater the torque, the greater the change in magnetic permeability becomes, and if a magnetostrictive constant of the shaft is set as positive, the magnetic permeability in the tensile direction (+σ direction) becomes large. Accordingly, since the magnetic flux is liable to pass in a leftwardly downward direction, as indicated by the arrow in the drawing, the generated magnetic flux crosses the windings 31 and 32 of the detecting coil 30, thereby generating an induced electromotive force. The greater the torque, the greater the electromotive force becomes. Accordingly, it is possible to detect the magnitude of the torque by measuring the electromotive force which is generated at both ends of the detecting coil 30.

If a torque acting in a reverse direction to that shown in the drawing is applied to the rotary shaft 50, the magnetic flux is liable to flow in a rightwardly upward direction. Hence, the phase of the crossing magnetic flux is inverted, so that it is also possible to detect the direction of the torque being applied to the rotary shaft 50 by detecting the phase by means of the synchronous rectifier 52.

In this embodiment, since the exciting and detecting coils 20 and 30 are fitted on the core 10 (legs 11a to 11d) which is formed of a material having high magnetic permeability, even if the number of turns of each winding and the exciting current are small, it is possible to increase the magnetic flux which is generated, so that the crossing magnetic flux which crosses each of the coils 20 and 30 becomes large when the torque is being applied. Consequently, the sensor is capable of exhibiting high sensitivity.

Furthermore, in this embodiment, since the exciting coil 20 is disposed at open-side distal ends of the legs 11a to 11d, it is possible to shorten the distance between the exciting coil 20 and an outer peripheral surface of the rotary shaft 50. As a result, it is possible to reduce the leakage magnetic flux, and the magnetic flux which is generated by the exciting current can be made effective (efficient) use of for the purpose of torque detection, thereby improving the sensitivity.

Figure 5:
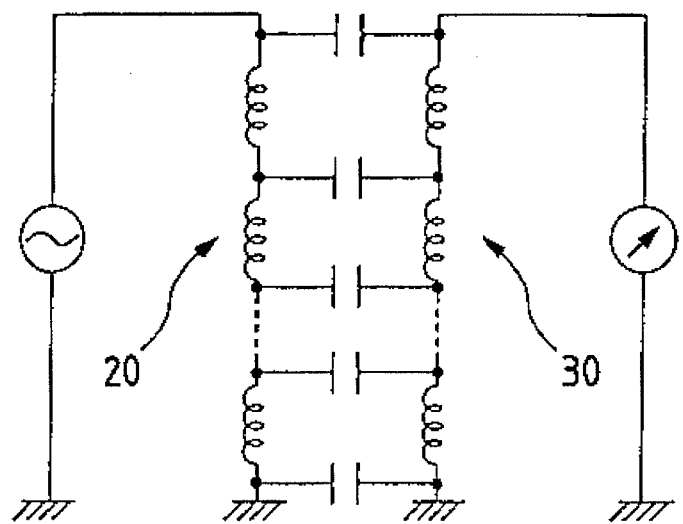
FIG. 5 shows an equivalent circuit of the torque sensor of FIG. 1.

The relationship between the exciting coil 20 and the detecting coil 30 can be shown by an equivalent circuit shown in FIG. 5, and a line capacity due to capacitive coupling occurs between the two coils 20 and 30. As the line capacity grows large, a leak current flows from the exciting coil 20 side the detecting coil 30 side, and wasteful power is consumed, resulting in a decline in the efficiency of conversion of the exciting current into the magnetic flux. In this embodiment, however, since the exciting coil 20 and the detecting coil 30 are spaced apart a predetermined distance along the axial directions of the legs 11a to 11d, it is possible to reduce the line capacity. Hence, the efficiency of conversion of the exciting current into the magnetic flux can be improved to increase the magnetic flux crossing the detecting coil 30 and to convert it into voltage efficiently. Thus, it is possible to further improve the detection sensitivity and attain a reduction in loss thereof.

Furthermore, since a baseplate portion 12 (see FIG. 1 and the like), which continues to the four legs 11a to 11d and is not provided with grooving, serves as a yoke, it is possible to suppress the occurrence of the leakage magnetic flux, thereby improving the detection sensitivity.

Figure 6:
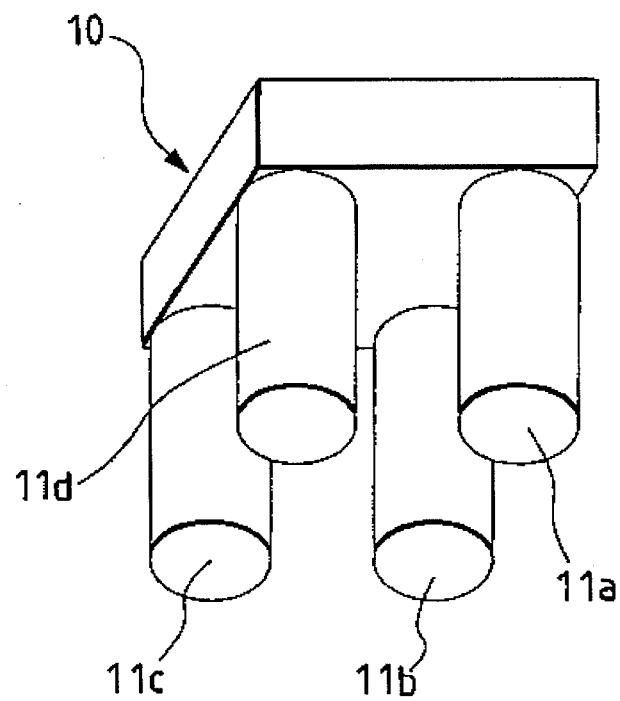
FIG. 6 is a perspective view showing a modification.

It should be noted that although, in the above-described embodiment, the core 10 is formed by cutting a cruciform groove in a rectangular parallelepiped block formed of a material having high magnetic permeability such as ferrite, the present invention is not limited to the same. For instance, as shown in FIG. 6, it is possible to use a core 10 in which the four legs 11a to 11d are cylindrical, and the shape thereof is arbitrary. In such a case, although a specific illustration will be omitted, the planar shape of each winding becomes substantially elliptic in correspondence with the outer peripheral surfaces of the legs 11a to 11d. As for the process of fabricating the same, instead of fabricating the legs of predetermined shapes by cutting, it is possible to form a predetermined mold in advance, and the core 10 may be fabricated by using the mold. Thus the fabrication process may be arbitrary.

Figure 7:
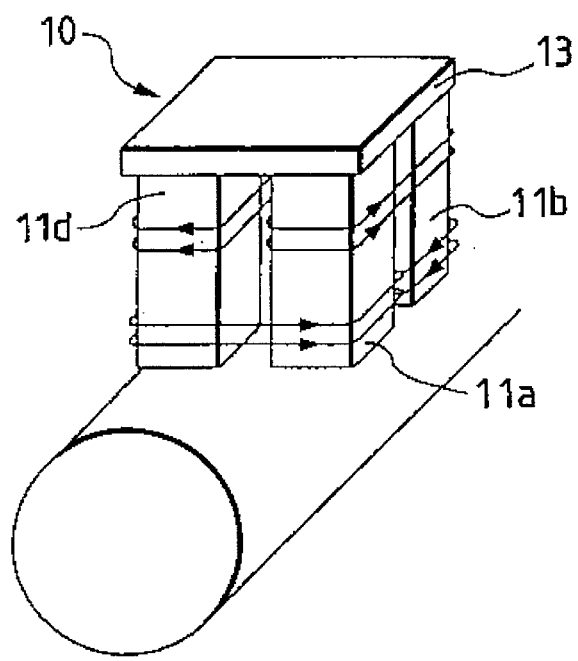
FIG. 7 is a perspective view showing another modification.

Further, as shown in FIG. 7, the legs 11a to 11d and a baseplate 13 to which they are attached may be formed separately, and may be integrated by bonding. In such a case, at least the legs 11a to 11d are formed of a material having high magnetic permeability, but if the baseplate 13 is also formed of a material having high magnetic permeability (the material may be either the same as or different from that of the legs), the function of the yoke is demonstrated, as described above.

Figure 8:
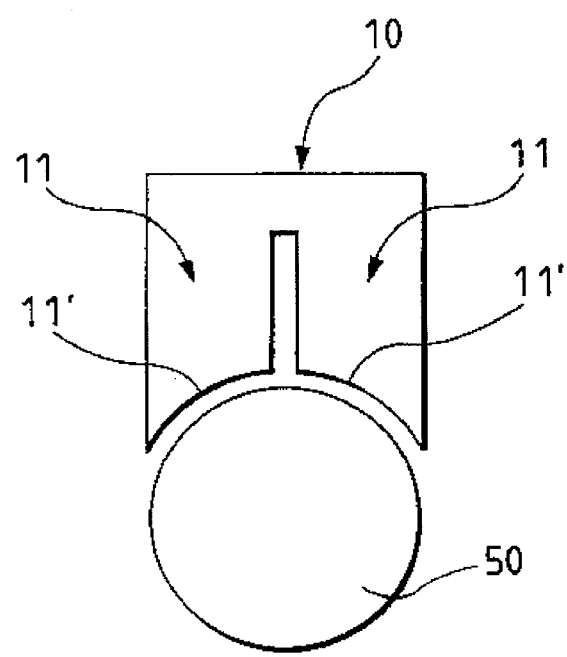
FIG. 8 illustrates still another modification.

Furthermore, as shown in FIG. 8, a radius may be provided for an open-side end face 11' of each leg 11 of the core 10 in such a manner as to conform to the outer peripheral surface of the rotary shaft 50. The adoption of such an arrangement makes it possible to suppress the magnetic flux leaking from the open-side end faces 11', and further improve the sensitivity of the sensor.

Figure 9A:
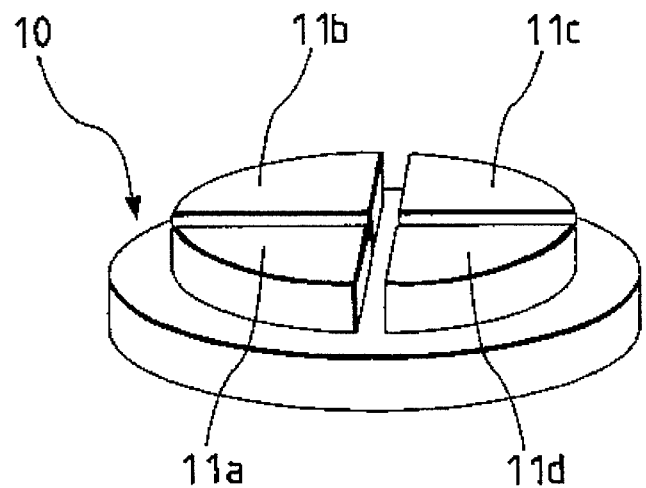
FIGS. 9A and 9B illustrate a further modification.

Still further, although, in the above-described embodiment and modifications, the arrangement provided is such that the legs 11 serving as core elements are made relatively long and the two coils 20 and 30 are spaced apart a predetermined distance in their axial direction, and the planar shape of each winding is made rectangular or elliptic, an arrangement may be provided such that, as shown in FIG. 9A, the core 10 may be provided with four legs 11a to 11d each having a planar shape of a sector with a central angle of 90 degrees, and may be formed into a flat shape with its projecting length made short.

Figure 9B:
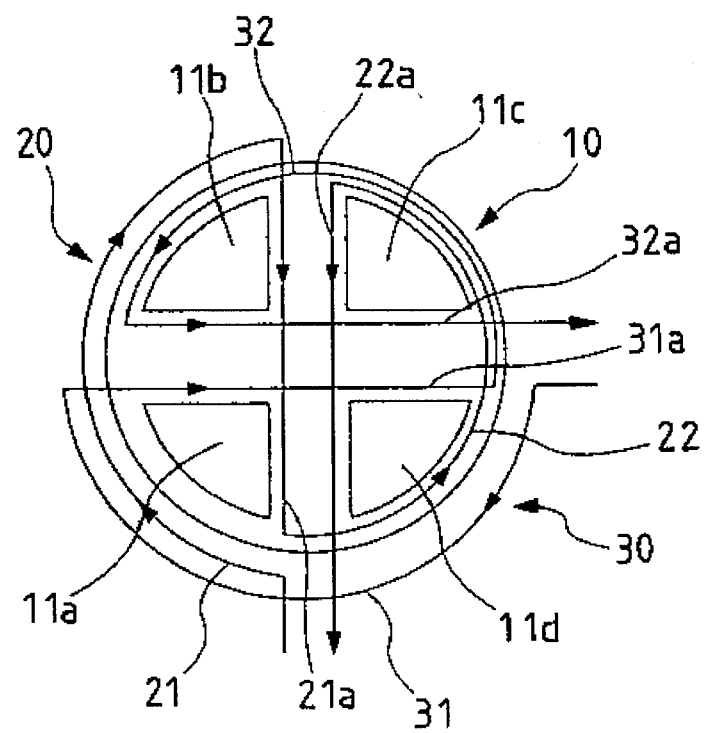

Then, as shown in FIG. 9B, the exciting coil 20 is provided with semicircular first and second windings 21 and 22, and is arranged such straight portions 21a and 22a of the first and second windings 21 and 22 are aligned on the same line (may be arranged in parallel in a closely juxtaposed state), and a circle is formed by the two windings 21 and 22. The windings 21 and 22 are each formed by winding one wire into a semicircular shape by a predetermined number of turns, as required. In a final stage of arrangement, the two windings 21 and 22 are wound in opposite directions by the same number of turns. The first winding 21 is wound around the legs 11a and 11b, while the second winding 22 is wound around the legs 11c and 11d.

Similarly, the detecting coil 30 has the first winding 31 which is arranged by being wound around the core elements 11a and 11d by a predetermined number of turns and the second winding 32 which is arranged by being wound around the legs 11b and 11c by a predetermined number of turns. Straight portions 31a and 32a of the first and second windings 31 and 32 are arranged in such a manner as to be aligned on the same line (may be arranged in parallel in a closely juxtaposed state).

As a result, the straight portions 21a and 22a of the exciting coil 20 and the straight portions 31a and 32a of the detecting coil 30 are disposed perpendicularly to each other, and the two coils 20 and 30 are arranged at positions offset from each other by 90 degrees.

If the above-described arrangement is adopted, since the two coils 20 and 30 are disposed in close proximity to each other, although the effect of the above-described leakage magnetic flux is present, the height can be reduced, and the sensor can be made compact. In addition, the area of magnetic pole with respect to the shape of the outer periphery (length) increases. Incidentally, if the effect of the leakage magnetic flux is large, the length of the legs 11a to 11d may be extended, as required. Since the other arrangements and the operation and effect are similar to those of the above-described embodiment, a description thereof will be omitted.

Figure 10:
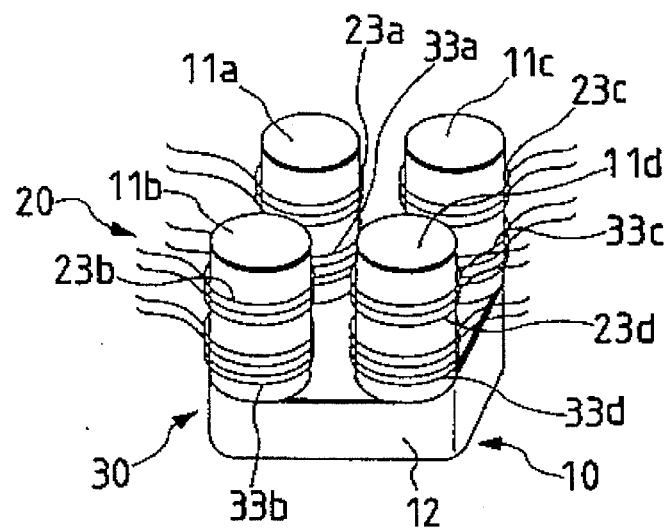
FIG. 10 is a perspective view showing a magnetostrictive torque sensor according to another embodiment of the invention.

FIG. 10 shows a second embodiment of the magnetostrictive torque sensor in accordance with the present invention. As shown in the drawing, the exciting coil 20 and the detecting coil 30 are disposed around the core 10, which has high magnetic permeability such as ferrite and is provided with the legs 11a to 11d constituting four cylindrical core elements arranged on vertices of a square, the exciting coil 20 and the detecting coil 30 being arranged one above the other with predetermined positional relationships.

Figure 11:
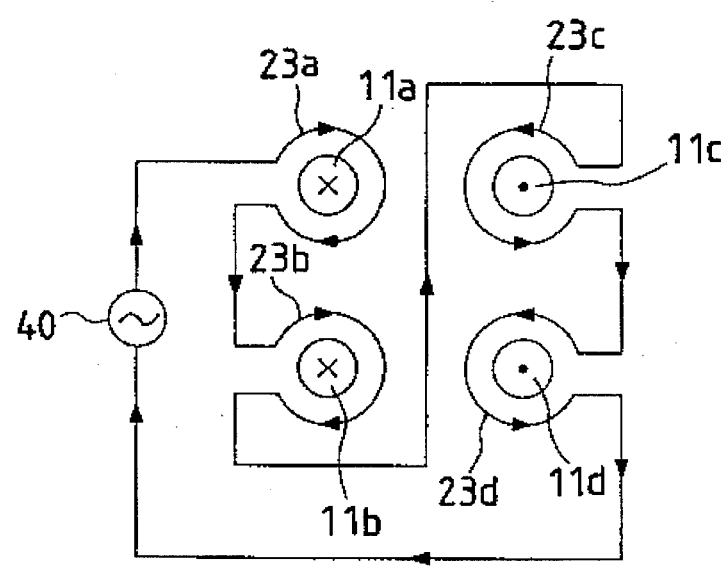
FIG. 11 shows an example of an exciting coil connecting method.

In this embodiment, the method in which each of the coils 20 and 30 is wound around the legs 11a to 11d differs from that of the above-described first embodiment. Namely, as for the exciting coil 20, first to fourth exciting windings 23a to 23d having the same number of turns are wound around the legs 11a to 11d, respectively, and the windings 23a to 23d are connected in a predetermined order, thereby forming a single continuous wire. Specifically, as shown in FIG. 11, the exciting windings 23a to 23d are connected appropriately such that, when electric current is allowed to flow across the single wire, the current through the first and second exciting windings 23a and 23b fitted around the two adjacent legs 11a and 11b flows in the same direction (in this example, clockwise), while the current through the third and fourth exciting windings 23c and 23d fitted around the other two adjacent legs 11c and 11d flows in the opposite direction (in this example, counterclockwise) to the aforementioned direction.

Consequently, as opposite ends of the single continuous wire are connected to an a.c. power supply 40 as illustrated in the drawing, at one instant the current flows as described above, and a magnetic flux is generated at the legs 11a to 11d in a predetermined direction. Incidentally, since it is an a.c. current, at another instant the current flows in an opposite direction to the one shown in FIG. 11, and the magnetic flux which is generated is oriented in the opposite direction.

It should be noted that the method of connecting the windings is not confined to the above-described embodiment, and it is essential only that current flows across the two adjacent exciting windings in the same direction and current flows across the remaining two exciting windings in the opposite direction thereto. In addition, to fit the coils (windings) around the legs 11a to 11d actually, the exciting coil 20 and the detecting coil 30 may be respectively formed by using one long wire and winding it around each of the legs sequentially in predetermined directions. Alternatively, the exciting coil 20 and the detecting coil 30 may be respectively formed by separately winding the windings around the legs, respectively, and by connecting the ends of the windings, as required. In particular, if the latter method is used, the winding processing is extremely facilitated.

Figure 12:
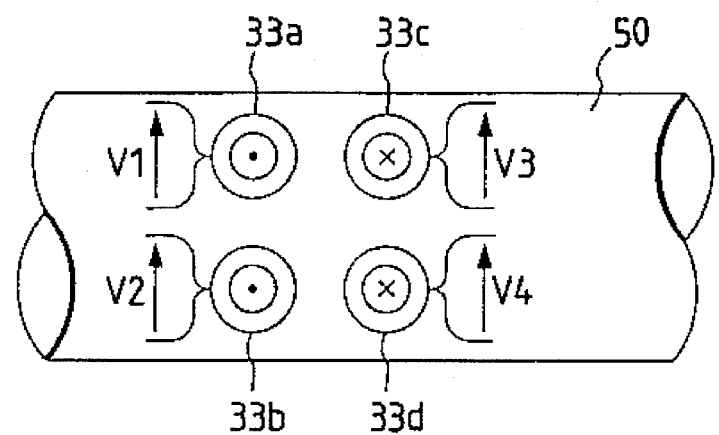
FIG. 12 shows an example of a detecting coil.

Meanwhile, in the same way as the windings constituting the above-described exciting coil 20, the detecting coil 30 is formed by winding first to fourth detecting windings 33a to 33d, respectively constituted by the same number of turns, around the legs 11a to 11d. Consequently, an induced electromotive force is generated in each detecting winding 33a to 33d due to the magnetic flux generated by the current flowing across the corresponding exciting windings 23a to 23d, respectively (see FIG. 12). Then, the detecting windings 33a to 33d are connected to a torque detector 45.

Figure 13:
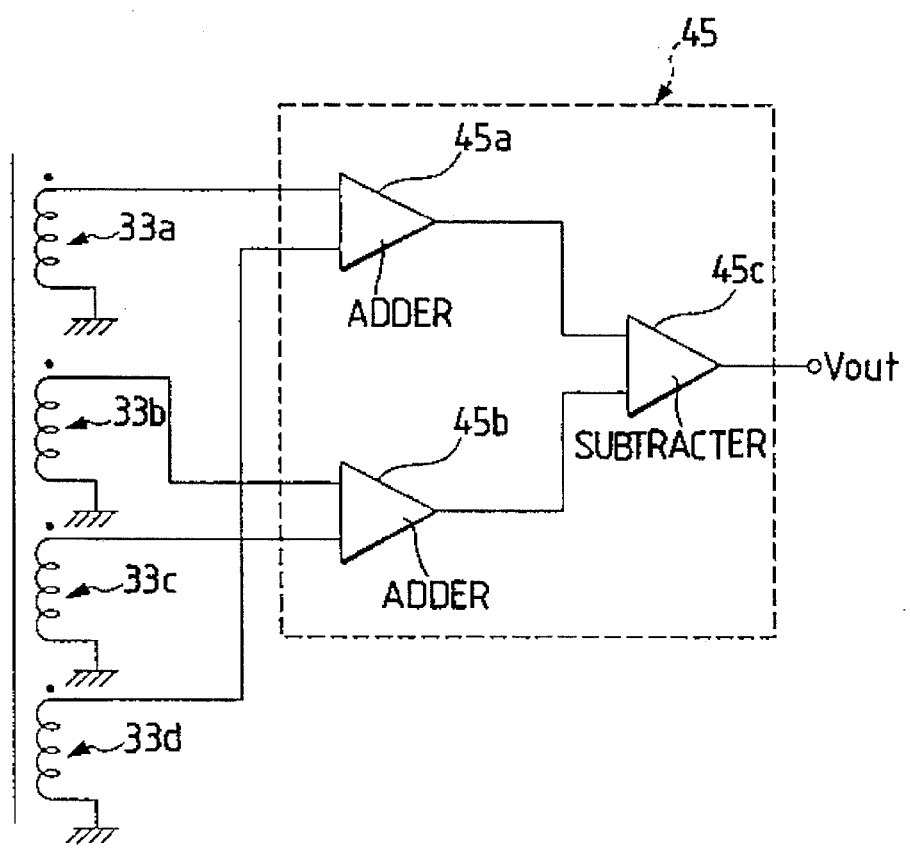
FIG. 13 shows an example of a torque detecting means.

As shown in FIG. 13, this torque detector 45 is arranged such that induced electromotive forces of the first detecting winding 33a and the fourth detecting winding 33d are inputted to a first adder 45a, induced electromotive forces of the second detecting winding 33b and the third detecting winding 33c are inputted to a second adder 45b, and the two adders 45a and 45b are connected to a subtractor 45c.

Furthermore, in this embodiment, the exciting coil 20 is disposed on the open side of the legs 11a to 11d, and the exciting coil 20 is disposed at the open-side distal ends, while the detecting coil 30 is located on the proximal-end side of the legs 11a to 11d. Consequently, the distance between the two coils 20 and 30 in the axial direction of the legs is made long.

Figure 14:
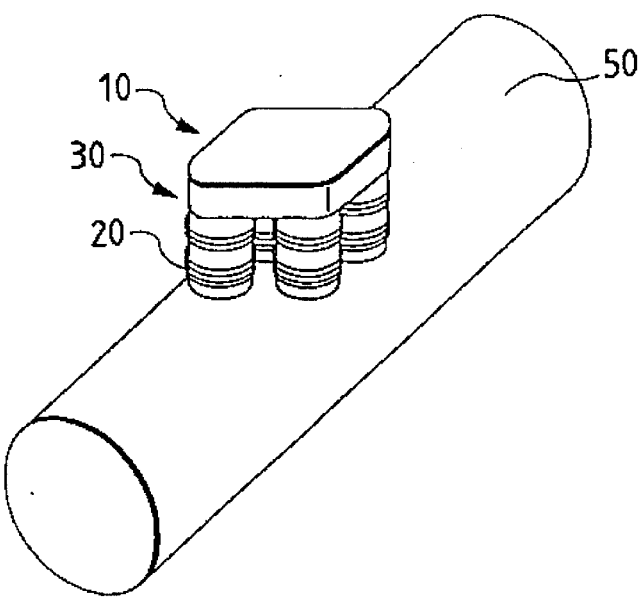
FIG. 14 is a perspective view showing how the torque sensor of FIG. 10 is used.

To mount the sensor having the above-described configuration, as shown in FIG. 14, the sensor is disposed in close proximity to the side of the rotary shaft 50 in face-to-face relation thereto, the rotary shaft 50 being formed of a magnetic material. At this time, the sensor is disposed such that the magnetic flux generated from the exciting coil 20 becomes parallel or perpendicular to the axial direction of the rotary shaft 50. Namely, the sensor is disposed such that each side (each line connecting the adjacent legs) of a phantom square, which is formed by connecting the legs 11a to 11d of the core 10, becomes parallel or perpendicular to the aforementioned axial direction. Incidentally, in this example, the sensor is disposed such that the generated magnetic flux passes in parallel.

Here, a description will be given of the basic principle of detection (operation) by the torque sensor. First, if a predetermined a.c. current is allowed to flow across the exciting coil 20 by using the a.c. power supply 40, a magnetic flux is concurrently generated from one pair of windings (e.g. the first and second exciting windings 23a and 23b), whose energizing directions are the same, to the other pair of windings (e.g., the third and fourth exciting windings 23c and 23d) of the exciting coil 20. Then, the magnetic flux is generated around the legs 11a to 11d of the core 10 having small magnetic resistance.

Figure 15A:
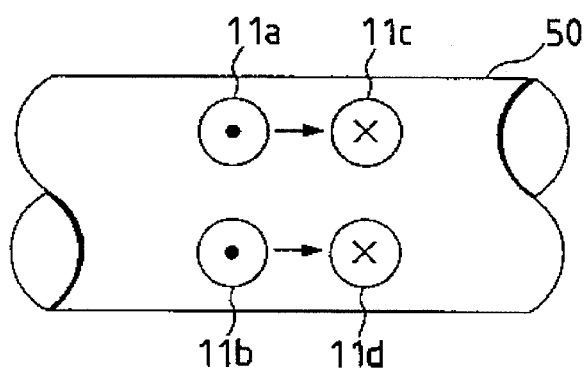
FIGS. 15A and 15B illustrate an operation.

At this time, as for the magnetic field generated by the current flowing across the exciting coil 20, since the magnetic flux flows through a path having small magnetic resistance, if no torque is being applied to the rotary shaft 50, at a given time the magnetic flux, which has flowed out from the leg 11a, passes through the rotary shaft 50 having the small magnetic resistance, and moves along the axial direction of the rotary shaft 50 so as to enter the leg 11c at a short distance thereto, as shown in FIG. 15A. Similarly, a magnetic flux which has flowed out from the leg 11b moves in the rotary shaft 50 along the axial direction, and enters the leg 11d. Incidentally, although an illustration is omitted, since the exciting current which is supplied to the exciting coil 20 is an a.c. signal, if the direction of flow of the current is reversed, the direction of each magnetic flux is also reversed.

Then, since the induced electromotive voltages V1 to V4 generated in the respective detecting windings 33a to 33d are in a relationship of V1=V2=V3=V4 (since the number of turns is the same), the output of the first adder 45a is V1+V4, while the output of the second adder 45b is V2+V3, and both assume the same value. Consequently, the output of the subtractor 45c becomes zero.

Figure 15B:
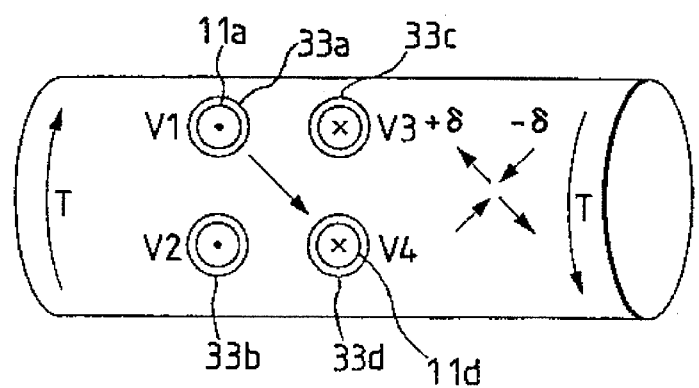

Meanwhile, as shown in FIG. 15B of the drawing, if a predetermined torque T is applied to the rotary shaft 50, stress is applied along a direction offset ±45 degrees with respect to the axial direction (±σ indicated by bidirectional arrows in the drawing). Then, the magnetic permeability at this portion changes due to a counter magnetostrictive effect. The greater the torque, the greater the change in magnetic permeability becomes, and if a magnetostrictive constant of the shaft is set as positive, the magnetic permeability in the tensile direction +σ direction) becomes large.

Accordingly, since the magnetic flux is liable to pass in a rightwardly downward direction, as indicated by the arrow in the drawing, the magnetic flux which crosses the first and fourth detecting windings 33a and 33d increases, and V1 and V4 become large. Accordingly, the output ((V1+V4)−(V2+V3)) of the subtractor 45c becomes positive. The greater the torque, the greater the magnitude of the output becomes. Accordingly, it is possible to detect the presence or absence of the torque by detecting the presence or absence of the output voltage of the subtractor 45c. Furthermore, it is possible to detect the magnitude of the torque from the voltage value thereof.

If a torque acting in a reverse direction to that shown in the drawing is applied to the rotary shaft 50, the magnetic flux is liable to flow in a leftwardly upward direction conversely to that shown in the drawing. Hence, since the voltage values of V2 and V3 become large in the above-described example, the output of the subtractor 45c becomes negative. Accordingly, it is also possible to detect the direction of the torque being applied to the rotary shaft 50.

Figure 16:
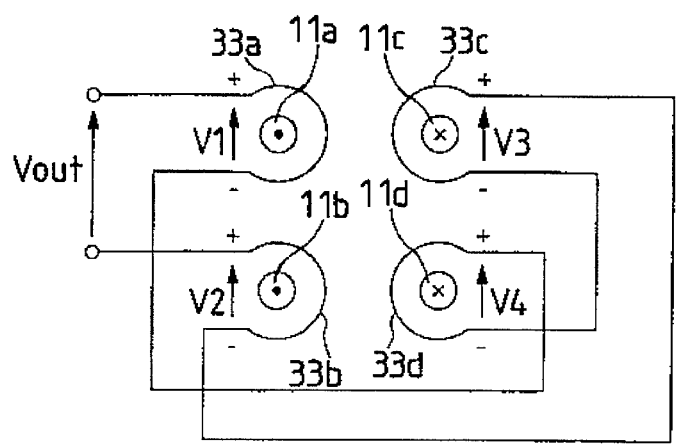
FIG. 16 shows another example of the torque detecting means.
Figure 19:
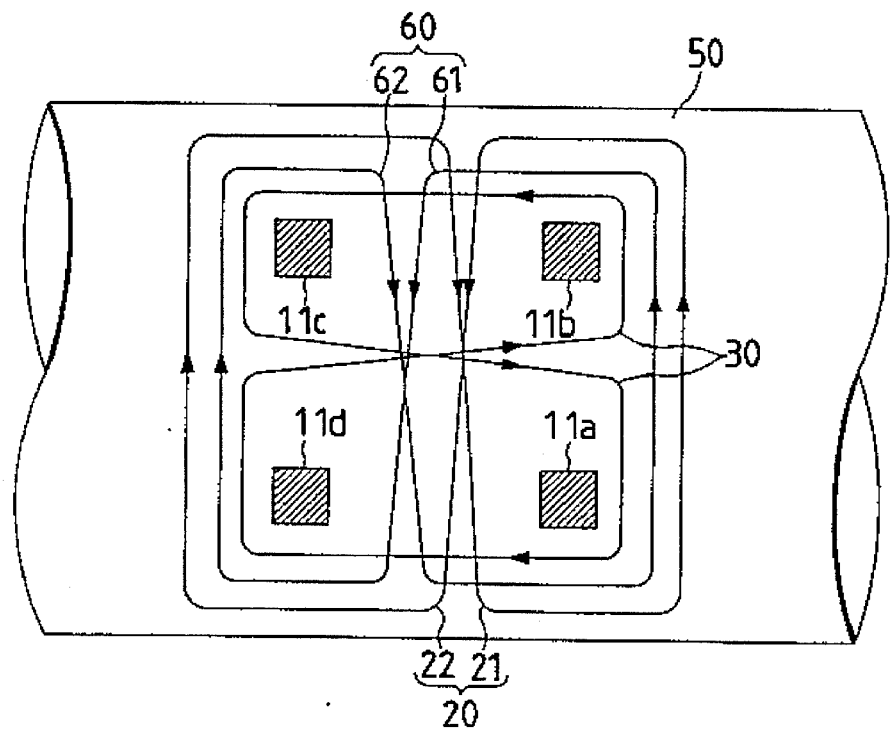
FIG. 19 shows how respective coils wound in the torque sensor of FIG. 18.

It should be noted that the detection of the output voltage in conjunction with the torque detected by the detecting coil is not confined to the above-described embodiment. For instance, as shown in FIG. 16, the detecting windings 33a to 33d may be connected in a predetermined order to form one continuous wiring, thereby to detect a voltage Vout (this has a meaning equivalent to the output of the subtractor) at both ends thereof (an equivalent circuit at that time is shown in FIG. 19). In such a case, since it suffices if connection is only provided, the arrangement can be simplified.

Furthermore, in the method of connecting the torque detector 45 of the above-described embodiment and the connecting method shown in FIG. 16, the arrangement provided in each case is such that $$vout=(V1+V4)-(V2+V3)$$

However, the present invention is not limited to the same, and, for instance, the arrangement may be provided as follows:

$$Vout=(V1-V2)+(V4-V3)$$

or $$Vout=(V1-V3)+(V4-V2)$$

Also, the shape of the core is not confined to the above-described embodiment, and each leg (core element) may be made a quadrangular prism in terms of its shape, or the leg portions and the baseplate for connecting the same may be formed of separate members and may be connected and integrated (e.g., the structure shown in FIG. 7). Furthermore, as shown in FIG. 8, the distal ends of the legs may be each provided with a radius to conform to the circumference of the rotary member, or, as shown in FIG. 9, each leg may be formed as a core of a flat shape. Thus, the shape of the core is arbitrary.

In the above-described embodiment, the exciting windings and the detecting windings are provided with the same number of turns for each winding, the present invention is not limited to the same, and it is essential only that adjustment is provided so that the output of the detecting coil side become zero when the torque is zero.

Still further, although a specific illustration is omitted, in the present invention, the core (core elements) may not necessarily be provided as in the case of the above-described embodiment. Namely, coreless coils may be used. Since this makes it possible to substantially eliminate the thickness, an ultracompact torque sensor can be obtained. In practice, to maintain the positional relationships among the windings of each coil, an arrangement is provided such that the windings are formed on both surfaces of one film sheet or on a plurality of film sheets, and the films are laminated with predetermined positional relationships, required. Then, if the film sheet is formed of a flexible member, the film can be curved with an arbitrary radius of curvature, thereby making it possible to dispose the sensor in close proximity to the rotary shaft subject to detection. Incidentally, since the other arrangements and the operation and effect are similar to those of the above-described first embodiment and its modifications, a description thereof will be omitted.

Figure 18:
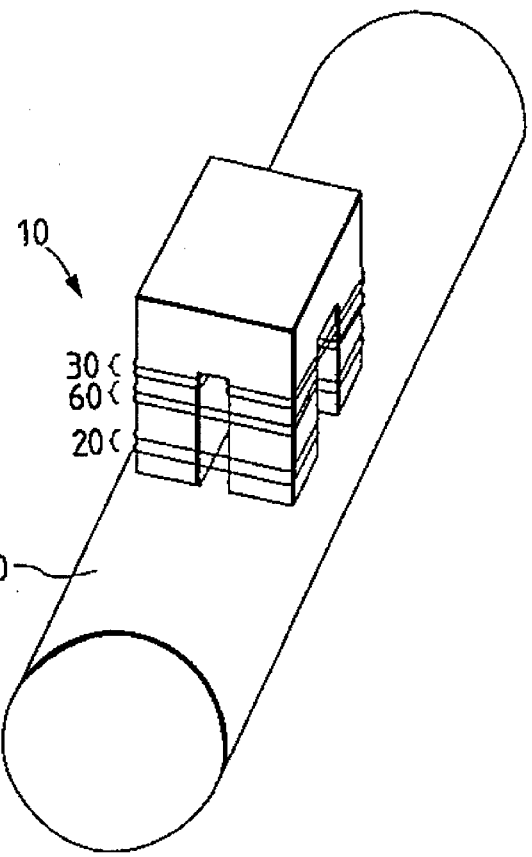
FIG. 18 is a perspective view showing a magnetostrictive torque sensor according to still another embodiment of the invention.
Figure 17:
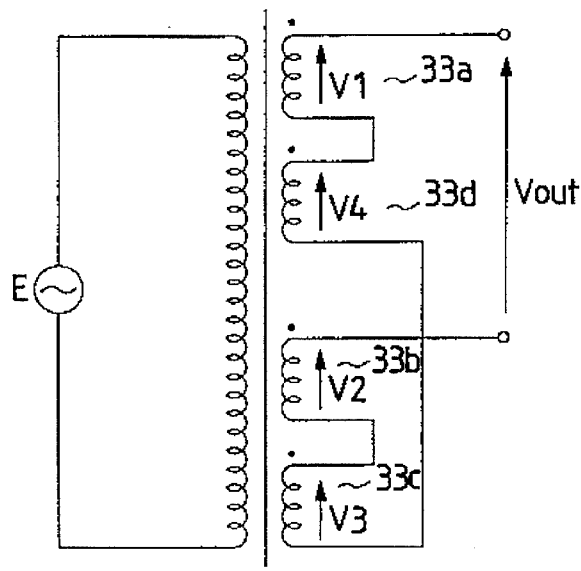
FIG. 17 shows an equivalent circuit of windings of the torque detecting means shown in FIG. 16.

FIG. 18 shows a third embodiment of the magnetostrictive torque sensor in accordance with the present invention. In this embodiment, the above-described first embodiment is used as a basis, and further improvements are made in the detection accuracy. Namely, in each of the above-described embodiments and modifications, the output of the detecting coil ideally becomes zero when the torque is zero. In practice, however there is the possibility that even in a state in which no torque is being applied, a magnetic flux crossing the detecting coil can be present and an output voltage is hence generated at the detecting coil. This is because a balance is not established among the windings due to an error in the fitting of the windings and at the time of winding, because a gap between the distal ends of the legs of the core and the surface of the rotary shaft is not uniform due to the problem of mounting accuracy when the magnetostrictive torque sensor is disposed in face-to-face relation to the rotary shaft, and for other reasons.

Accordingly, in this embodiment, in addition to the exciting coil 20 and the detecting coil 30, a search coil 60 is fitted around the legs 11a to 11d of the core 10 at a predetermined position, so as to measure the total amount of magnetic flux generated by the exciting coil 20 and to effect predetermined correction processing on the basis of it.

This search coil 60 is comprised of two search windings 61 and 62, and these search windings 61 and 62 are respectively wound around predetermined two legs in the same way as the first and second windings 21 and 22 constituting the exciting coil 20, as shown in FIGS. 18 and 19, thereby substantially forming a figure of eight as a whole.

Figure 20:
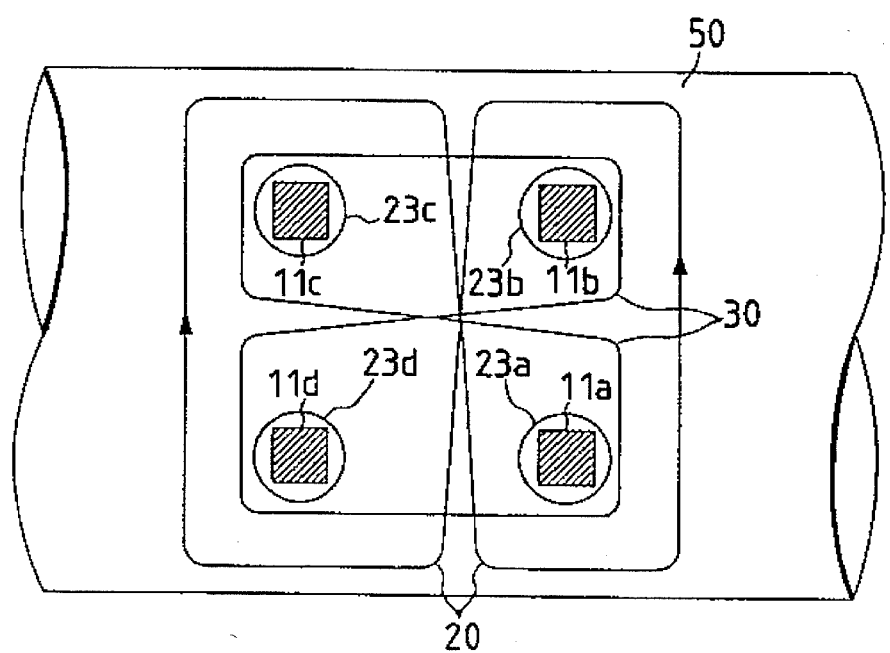
FIG. 20 shows a method of winding a search which method is different from the winding method of FIG. 18.

In addition, as another method of winding this search coil 60, the windings 23a to 23d may be wound around the legs 11a to 11d of the core 10 as in the method of winding the respective windings in the above-described second embodiment, and they may be connected in series, as required, as shown in FIG. 20. In addition, the sequence in which the windings are connected in series is determined such that the amount of magnetic flux crossing the search coil 60 is not affected by the amount of torque applied to the shaft and is affected only by the gap between the distal ends of the legs 11a to 11d and the rotary shaft 50. In other words, it suffices if the windings are wound in such a manner as to detect the total amount of magnetic flux generated by the exciting coil 20. Incidentally, since various basic arrangements including the relative position of the sensor (core 10) with respect to the rotary shaft 50, the basic principle of torque detection, and the like are similar to those of the above-described first embodiment, a description thereof will be omitted.

Figure 21:
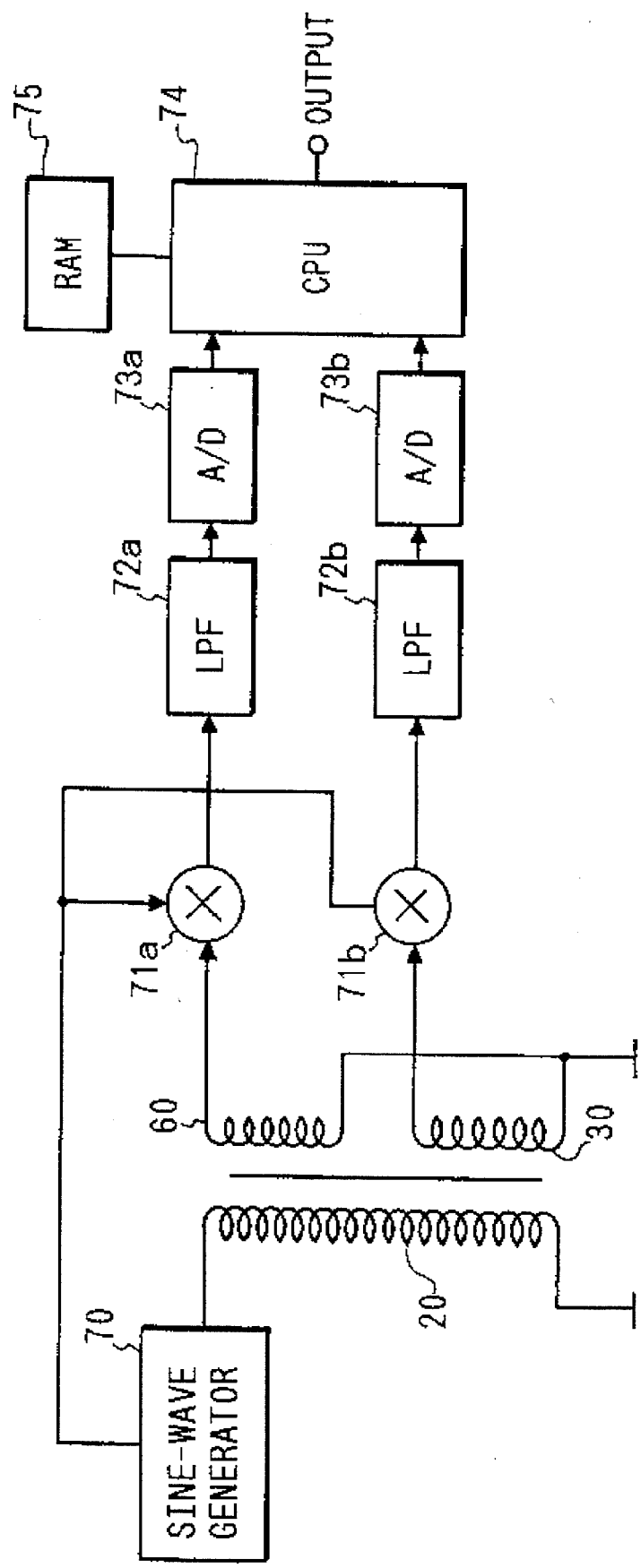
FIG. 21 is a block diagram showing a magnetostrictive torque measuring apparatus according to an embodiment of the invention.

FIG. 21 illustrates an embodiment of a magnetostrictive torque measuring apparatus in accordance with the present invention. The coils 20, 30, and 60 in the magnetostrictive torque sensor with the search coil 60, shown in FIGS. 18 to 20, have an equivalent circuit such as the one shown in FIG. 21. Then, if an output of a sine-wave generator circuit 70 is applied to the exciting coil 20 to apply an a.c. signal, an induced electromotive force corresponding to the total amount of the magnetic flux generated by the exciting coil 20 is produced at both ends of the search coil 60 irrespective of the magnitude of the torque applied to the rotary shaft. Meanwhile, an induced electromotive force corresponding to the magnitude of the torque applied to the rotary shaft is generated at both ends of the detecting coil 30. A predetermined induced electromotive force is generated at the detecting coil 30 even when the torque is not being applied, for the above-described reason.

In this example, outputs of the search coil 60 and the detecting coil 30 are inputted to multipliers 71a and 71b, respectively, and after these outputs are respectively multiplied by an output of the sine-wave generator circuit 70, the outputs are passed through low-pass filters 72a and 72b, so as to effect synchronous detection and obtain d.c. outputs. As the d.c. outputs are respectively inputted to an A/D converter 73a and 73b and are converted to digital values, the outputs are inputted to a CPU 74. A real output corresponding to the magnitude of proper torque (not affected by fluctuations and the like of the gap) is obtained on the basis of the two data (outputs of the detecting coil 30 and the search coil 60) provided by the CPU 74 and correction data stored in a RAM 75.

Figure 22:
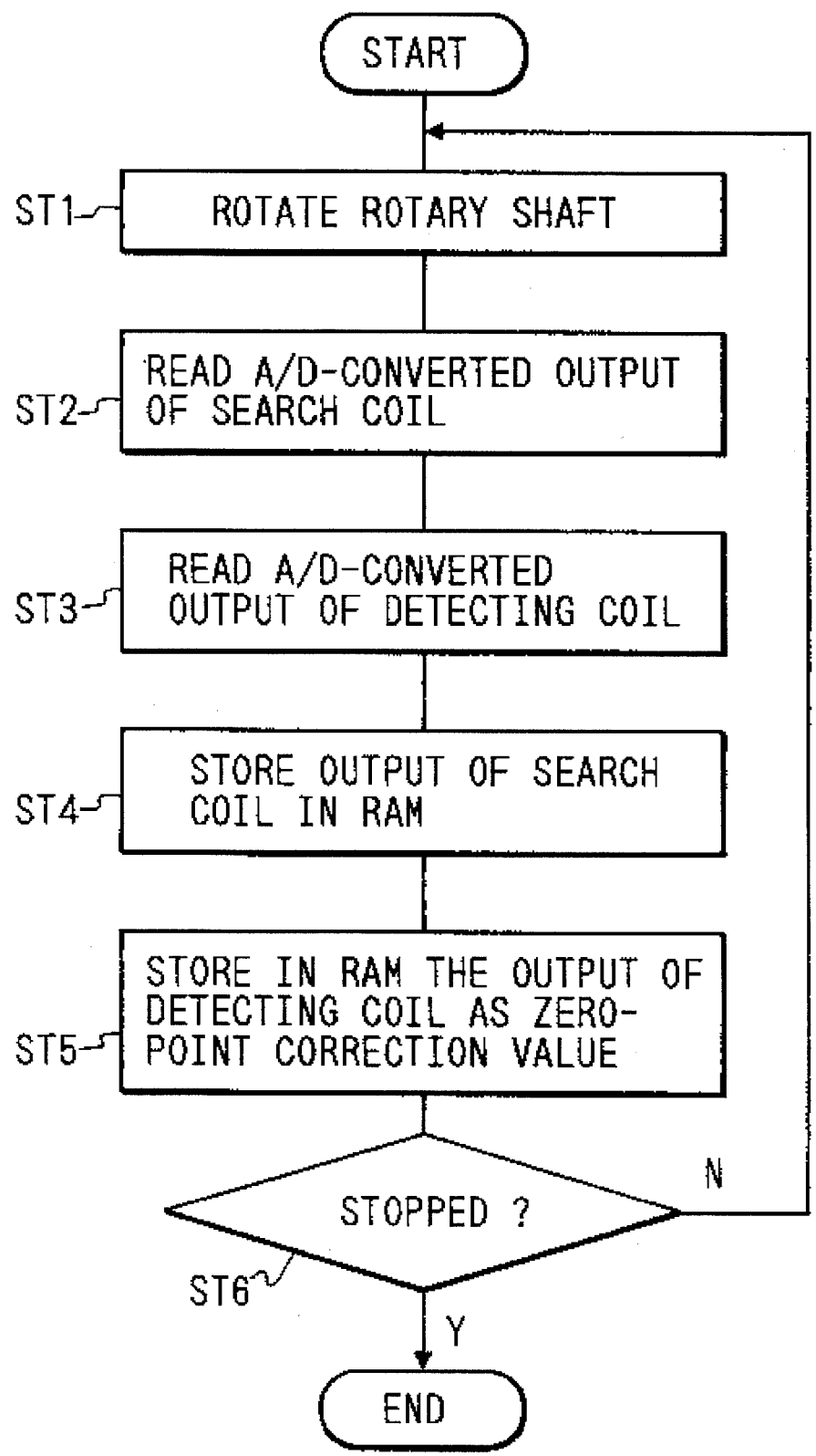
FIG. 22 is a flowchart showing one of functions of a CPU serving as a correcting means.
Figures 23, 24:
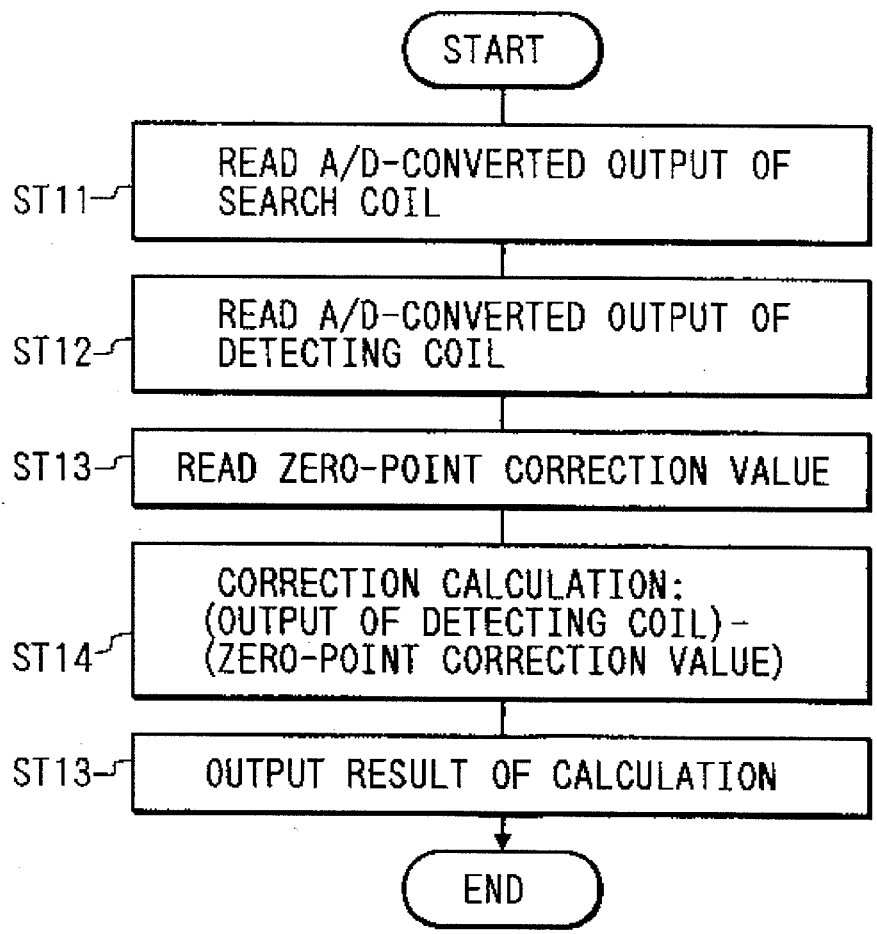
FIG. 23 shows an example of a table stored in a RAM.
FIG. 24 is a flowchart showing another function of the CPU serving as the correcting means.

Specific processing functions of the CPU 74 include a function for generating a correction table (see FIG. 23) stored in the RAM 75 shown in FIG. 22 as well as a correction function at the time of actual measurement of torque shown in FIG. 24.

First, to describe the function of generating the correction table, a predetermined a.c. current is applied to the exciting coil 20, and the rotary shaft 50 is rotated in a state in which no torque is applied to the rotary shaft 50 (ST1). In this state, an output of the synchronous detection by the search coil 60 and an output of the synchronous detection by the detecting coil 30 are respectively read (ST2, ST3). A table is formed in which the outputs of the search coil 60 and the detecting coil 30, which have been read at the same timing, are paired, and the table is stored in the RAM 75 (ST4, ST5). Outputs of the detecting coil when the torque is zero are attributable to deviations of the gap and other balance, and can be regarded as being fixed irrespective of the value of the torque. Hence, that value can be regarded as an offset value. Accordingly, as also shown in FIG. 23, the output of the detecting coil 30 is stored as a zero-point correction value. Then, the above processing is carried out until the rotation of the rotary shaft is stopped (ST6).

In addition, during the actual measurement of torque, a predetermined a.c. current is applied to the exciting coil 20, and outputs of the search coil 60 and the detecting coil 30 are read in a state in which torque is being applied to the rotary shaft (ST11, ST12). Then, referring to the table stored in the RAM 75 on the basis of the output of the search coil 60 which has been read, a corresponding zero-point correction value is obtained (ST13).

Subsequently, the zero-point correction value is subtracted from the output of the detecting coil 30 (ST14).

Consequently, the fluctuations of the output of the detecting coil due to factors other than the torque are eliminated, and a real output corresponding to the torque applied to the rotary shaft 50 is obtained. Then, the calculated result is outputted, thereby completing the correction detection processing (ST15).

Although, in FIG. 21, a device for outputting the torque value (after correction) obtained by the CPU 74 is not shown, in practice, it is possible to use various output devices such as a display unit such as a display, a printer, a voice outputting device, and the like.

Although the output of the search coil and the output of the detecting coil should correspond one-to-one with each other, there are possibilities that a plurality of outputs are produced from the detecting coil in correspondence with the output of the same search coil due to measurement errors, errors during A/D conversion, and the like. However, even if a plurality of outputs are produced, since such values are approximate to each other, it is possible to cope with the situation by setting as the zero-point correction value a value obtained by performing predetermined numerical calculation processing with respect to a mean value or an arbitrary value (e.g., a central value) among such values.

In addition, in the above-described embodiment, a description has been given of an example in which the arrangement of the first embodiment is set as a basis, and the search coil is fitted at a predetermined position thereof. However, the present invention is not limited to the same, and can be applied to magnetostrictive torque sensors of various arrangements shown in the modifications of the first embodiment and the second embodiment.

Figure 25:
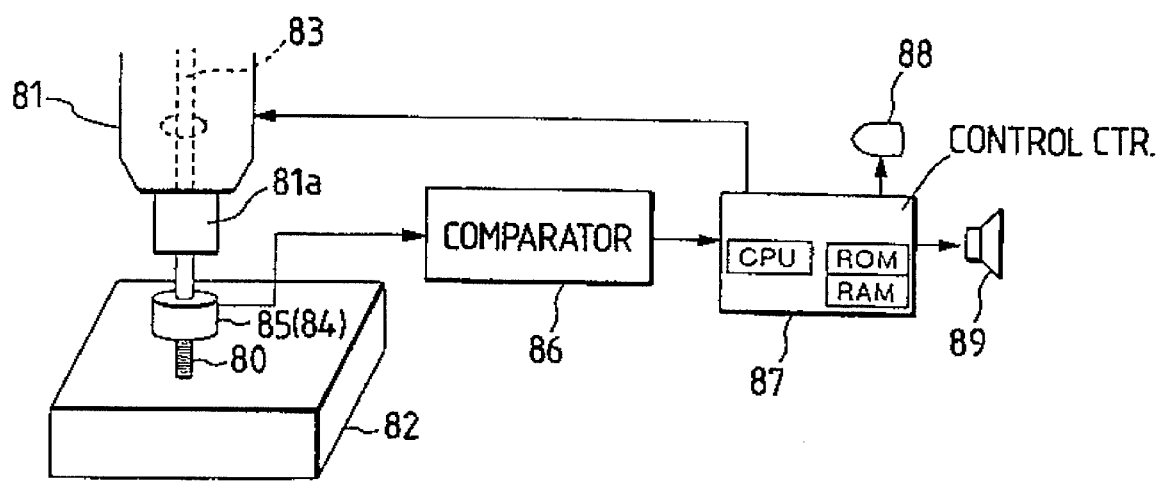
FIG. 25 shows a condition-monitoring apparatus for a cutting tool according to an embodiment of the invention.

FIG. 25 illustrates an embodiment of a condition-monitoring apparatus for a cutting tool in accordance with the present invention. As show in the drawing, in this example, an example is shown in which a drill for drilling is used as a cutting tool which is detachably mounted on a machine tool. Namely, a drill 80 is gripped by a chuck 81*a* of a machine tool body 81, is rotated by receiving a rotating force of a drive motor incorporated in the machine tool body 81, and effects cutting with respect to a work (workpiece) 82 disposed at a lower end thereof, so as to drill a predetermined hole.

An attachment jig 85 incorporating a magnetostrictive torque sensor 84 having the arrangement described in the foregoing embodiments is set over the drill 80 at a predetermined position. By means of this attachment jig 85, the torque sensor 84 is disposed in face-to-face relation to the outer peripheral surface of the drill 80 in non-contact therewith. In addition, during this attachment, a measure is provided such that the rotation and the lifting and lowering motion of the drill 80 will not be hampered. Although the torque sensor 84 may also undergo lifting and lowering motion by following the lifting and lowering of the drill 80, it is preferable for the torque sensor 84 to be fixed in the rotating direction in the light of the relationship of the transmission and reception of signals.

Figure 26:
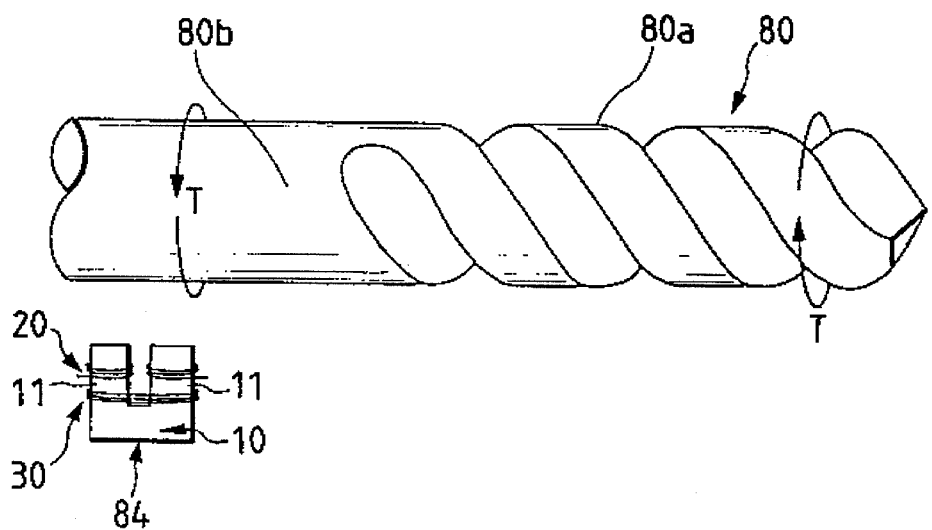
FIGS. 26 and 27 illustrate a mounting position of the magnetostrictive torque sensor with respect to a cutting tool.

A specific position of attachment of the sensor 84 is set as shown in FIG. 26. As shown in FIG. 26, the drill 80 is comprised of a blade 80*a* and a shank 80*b* which is not provided with a groove. Incidentally, various cutting tools other than the drill are used in common by rotation, a grinding stone and other processing members being disposed instead of the blade, and the shank being disposed on the proximal end side.

The torque sensor 84 is disposed in face-to-face relation to the outer side of the shank 80*b* portion of the drill 80. At this time, an arrangement is provided such that the open side of the legs 11 of the core 10 is located in close proximity to the outer peripheral surface of the shank 80*b*, and the direction in which the exciting coil 20 and the detecting coil 30 fitted around the legs 11 are arranged becomes parallel or perpendicular to the axial direction of the drill 80. Incidentally, this specific arrangement is equivalent to that of each embodiment and modification of the sensor described above, and it can be assumed that the illustrated rotary shaft 50 is substituted by the shank 80*b*.

Figure 27:
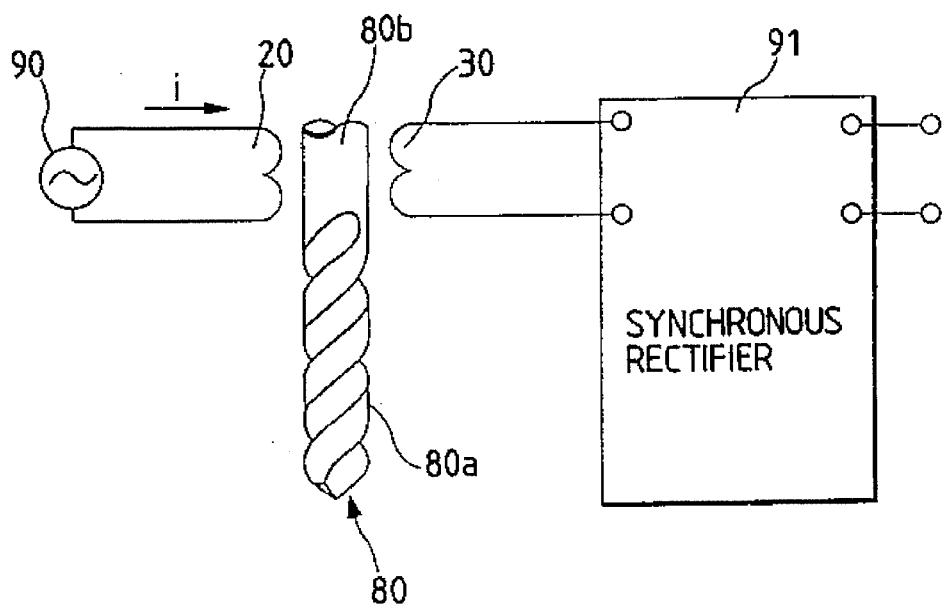

As shown in FIG. 27, the exciting coil 20 is connected to an a.c. power supply 90, and the detecting coil 30 is connected to a synchronous rectifier 91. In accordance with the above-described operating principle of the torque sensor, if an a.c. signal is allowed to flow to the exciting coil 20 by the a.c. power supply 90 in a state in which torque is being applied, an induced voltage is induced on the detecting coil 30 side by electromagnetic induction, and a predetermined a.c. signal is outputted. Incidentally, in a state of no load (no torque is being applied), the outputs of the detecting coil 30 and the synchronous rectifier 91 become zero. Although not shown in FIG. 25, with respect to the torque sensor 84 inside the attachment jig 85, an a.c. signal is imparted from outside the same to the exciting coil 20.

In addition, as shown in FIG. 25, the output of the torque sensor 84 (the output of the synchronous rectifier 91) is transmitted to a control circuit 87 serving as a control-signal generating means, via a comparator 86 serving as a determining means. Then, this control circuit 87 effects feedback control of the machine tool body 81 on the basis of the output (L/H) of the comparator 86, and effects predetermined displaying and the like.

Figure 28A:
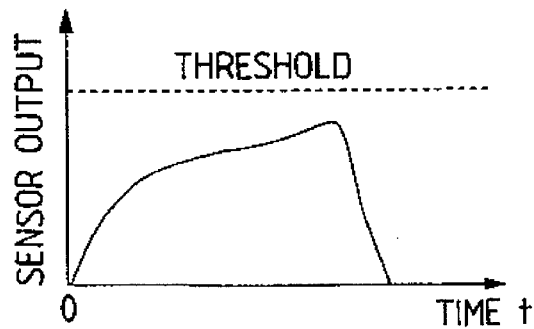
FIGS. 28A and 28B are graphs showing a principle of operation of a controller shown in FIG. 25.
Figure 28B:
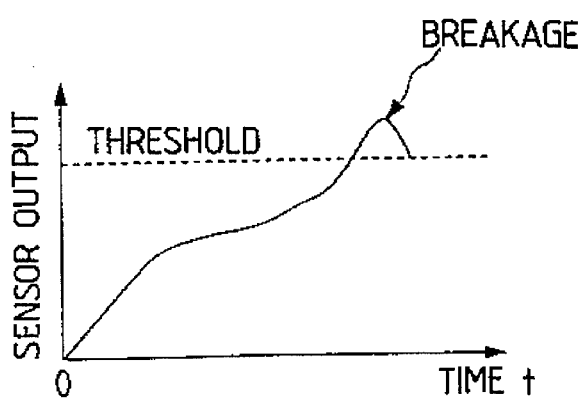

Namely, when a hole is drilled in the work 82, the fluctuation of torque with respect to time t is as shown in FIG. 28A in a normal case, and as shown in FIG. 28B in the case of an abnormality (breakage). Accordingly, the torque (sensor output) which cannot be assumed in the normal case is set as a threshold value and is set as a reference voltage of the comparator 86. Then, in a normal case, since the reference voltage is always higher, the output becomes L, but in the case of breakage or the like the sensor output exceeds the threshold value in the course of it, so that the output of the comparator 86 changes to H.

Then, the control circuit 87 outputs the abnormality to a display unit 88 such as a display, lights up a lamp (alarm or the like), or notifies the operator through voice via a voice-outputting unit 89, thereby issuing an abnormality signal with respect to the machine tool body 81. On the basis of the abnormality signal, the machine tool body 81 lowers the output of the drive motor, or stops or reverses the drive motor, and effects predetermined processing such as lifting the drill.

FIGS. 29 and 30 show another embodiment of the condition-monitoring apparatus for a cutting tool. In the embodiment shown in FIG. 25, binary control of ON/OFF is provided, but in this embodiment continuous control is made possible with respect to the magnitude of the torque. Namely, as shown in FIG. 29, the machine tool body is provided with a main spindle motor 92 for forwardly and reversely rotating the drill 80 and a feed motor 93 for vertically moving the drill 80, and the rotation of the two motors 92 and 93 is controlled by drivers 95 and 96 upon receipt of speed commands from a cutting controller 94. As a result, while the drill 80 is being rotated forwardly at a predetermined speed by the main spindle motor 92, the feed motor 93 is operated to lower the drill 80. As the drill 80 is thus brought into contact with the work 82 under a predetermined pressure, cutting (drilling) work is carried out.

At this time, if the rotational output of the feed motor 93 is increased, the processing time is shortened, but a reactionary force which the drill 80 receives from the work 82 is strong, and a large torque is applied to the drill 80, so that there is the risk of breakage. On the other hand, if the output of the feed motor 93 is lowered, the breakage of the drill 80 is reduced as practically as possible, but the processing time becomes long. In other words, if the number of revolutions of the drill 80 is fixed, the torque applied to the drill is dependent on the amount of feed (lowering speed).

Accordingly, in this embodiment, the torque sensor 84 (see FIGS. 25 to 27) in accordance with the present invention is provided on the outer side of the shank portion of the drill 80, and the output of the torque sensor 84 is transmitted to the cutting controller 94, whereby cutting work is carried out in a state in which a torque of a fixed torque or more is not applied to the drill 80 through feedback control.

Namely, as shown in FIG. 30, the cutting controller 94 is comprised of a PID controller 94a serving as a determining means, a feed-speed calculating unit 94b serving as a control-signal generating means, and a main-spindle-rotation controlling unit 94c. The difference between a signal based on the torque applied to the drill 80, which is detected by the torque sensor 84, and a signal based on a set load is inputted to the PID controller 94a. Here, the set load is a value in which a predetermined margin is provided with respect to the torque under which the drill 80 becomes broken. Incidentally, the main-spindle-rotation controlling unit 94c is adapted to issue a control signal to the main-spindle-motor driver 95 so as to rotate the main spindle motor 92 at a fixed speed.

In this state, the PID controller 94a determines the lowering speed, i.e., the amount of feed, of the drill 80 on the basis of the positive or negative state of the input signal and its absolute value. In other words, if the input signal is negative, the torque being applied to the drill 80 exceeds the set load and there is a high possibility of breakage, so that it is necessary to lower the amount of feed or reverse the motor (raise the drill). Meanwhile, if the input signal is positive, since the torque being applied to the drill 80 is smaller than the set load, the possibility of breakage of the drill is low even if the torque being applied to the drill 80 is increased slightly, so that the amount of feed is increased to improve the processing efficiency. The amount of increase or decrease described above is determined from the absolute value of the input signal to the PID controller 94a. The amount of feed thus determined is transmitted to the feed-speed calculating unit 94b in the ensuing stage, a speed of the feed motor 93 which is necessary for obtaining that amount of feed is determined, and the determined speed is outputted as a control signal to the motor driver 96.

The adoption of such an arrangement makes it possible to maintain the torque (load) applied to the drill 80 below the breakage level during cutting. Since no undue load is applied to the drill, it is possible to prolong the life of the drill. In addition, by detecting the torque value, it is possible to ascertain the degree of wear of the drill, and it becomes easy to obtain a criterion for replacement.

In addition, although, in each of the above-described embodiments, a description has been given of an example in which a drill is used as a cutting tool, the present invention is not limited to the same, and it is possible to use a grinding stone and various other types other than the drill. In other words, as machine tools which use such cutting tools, there are machine tools which effect various processing by using rotary cutting tools, such as drills, milling machines, drilling machines, and honing machines.

Furthermore, in each of the above-described embodiments, the torque sensor is disposed in face-to-face relation to the outer side of the shank of the cutting tool to directly measure the torque applied to the cutting tool. For instance, a main spindle 83 for transmitting the rotational force of the drive motor is provided at an upper end of the chuck 81a. This main spindle 83 and the chuck 81a and, hence, the drill 80 (cutting tool) rotate and move as a unit. Accordingly, the torque applied to the drill 80 is also applied to the main spindle 83 as well. For this reason, the magnetostrictive torque sensor in accordance with the present invention may be disposed at a predetermined position on the outer side of the main spindle 83 with a predetermined positional relationship kept therebetween.

As described above, in the magnetostrictive torque sensor in accordance with the present invention (first embodiment), when torque is not being applied to the rotary shaft, there is no output on the detecting coil side, and if torque is applied, an output corresponding to the magnitude of that torque is generated on the detecting coil side. Moreover, the phase of the output signal generated on the detecting coil side with respect to an a.c. signal applied to the exciting coil side differs depending on the direction of torque. Hence, torques which are produced in two mutually perpendicular directions at the same place can be detected by measuring the magnitude of the output (including the presence or absence thereof) and the phase thereof.

In addition, in the magnetostrictive torque sensor according to the second embodiment, when torque is not being applied to the rotary shaft in the same way as described above, induced electromotive forces generated in the detecting windings become substantially equal, whereas if torque is applied, the induced electromotive force of the detecting windings located on one diagonal line increases in correspondence with the magnitude of the torque. Accordingly, by measuring the magnitude of the output (including the presence or absence thereof) and the phase thereof, it is possible to detect torques which are produced in two mutually perpendicular directions at the same place. Moreover, since the area of each magnetic pole extends substantially over the entire surface of the sensor (coil), the detection sensitivity improves. Additionally, in cases where the windings are wound around the core elements, the torque sensor becomes a more high-sensitivity torque sensor.

In addition, in the magnetostrictive torque sensor and the torque measuring apparatus using the search coil, the zero-point correction is effected by making use of the output of the search coil, so that it is possible to obtain an output corresponding to a real torque applied to the object to be measured. As a result, even if there is unevenness in the fitting of the coils and in the accuracy with which the sensor is mounted with respect to the object to be measured, it is possible to measure the torque with high accuracy by conducting the above-described predetermined correction processing.

Furthermore, in the condition-monitoring apparatus for a cutting tool in accordance with the present invention, since the torque applied to the cutting tool can be detected in non-contact therewith and in a simple arrangement, it is possible to determine not only the presence or absence of breakage but also whether the possibility of breakage is high or not, and detect the condition of the cutting tool such as the chipping off or wear of the blade. Since detection is effected magnetically, the detection is not liable to be affected by the environment during cutting, and the detection is possible irrespective of the diameter of the cutting tool.

What is claimed is:

1. A magnetostrictive torque sensor comprising:

a core;

an exciting coil including four exciting windings which are supported by the core and are arranged at apices of an imaginary square, two adjacent ones of the four exciting windings and the other two adjacent exciting windings being wound in opposite directions; and a detecting coil supported by the core and including four detecting windings which generally coextend with respective exciting windings, wherein the torque sensor is disposed adjacent to a rotary body whose torque is to be measured such that adjacent two of the four exciting windings are arranged either parallel or perpendicularly to an axial direction of the rotary body.

2. The magnetostrictive torque sensor according to claim 1, wherein the core has four pillar-shaped core elements on which the exciting windings and the detecting windings are wound respectively.

3. A magnetostrictive torque sensor according to claim 1, further comprising a search coil which is wound so as to allow detection of total magnetic flux generated by the exciting coil, an output of the search coil being used to correct an output of the detecting coil.

4. A magnetostrictive torque sensor comprising:

a core having four pillar-shaped core elements;

an exciting coil including first and second windings which are wound in opposite directions so as to generally assume a figure eight, each of the first and second windings being wound on adjacent two of the four core elements;

a detecting coil including first and second windings which are wound in opposite directions so as to generally assume a figure eight, each of the first and second windings being wound on adjacent two of the four core elements, the detecting coil being oriented orthogonally to the exciting coil;

wherein the torque sensor is disposed adjacent to a rotary body whose torque is to be measured such that adjacent two of the four core elements are arranged either parallel or perpendicularly to an axial direction of the rotary body; and a search coil which is wound so as to allow detection of total magnetic flux generated by the exciting coil, an output of the search coil being used to correct an output of the detecting coil.

5. A magnetostrictive torque measuring apparatus comprising:

a magnetostrictive torque sensor including a core having four pillar-shaped core elements;

an exciting coil including first and second windings which are wound in opposite directions so as to generally assume a figure eight, each of the first and second windings being wound on adjacent two of the four core elements;

a detecting coil including first and second windings which are wound in opposite directions so as to generally assume a figure eight, each of the first and second windings being wound on adjacent two of the four core elements, the detecting coil being oriented orthogonally to the exciting coil;

wherein the torque sensor is disposed adjacent to a rotary body whose torque is to be measured such that adjacent two of the four core elements are arranged either parallel or perpendicularly to an axial direction of the rotary body; and a search coil which is wound so as to allow detection of total magnetic flux generated by the exciting coil, an output of the search coil being used to correct an output of the detecting coil;

means for storing zero-point correction data which are generated based on outputs of the search coil and the detecting coil obtained when the rotary body is rotated with no torque exerted thereon; and means for reading a zero-point correction value from the storing means based on an output of the search coil when torque is exerted on the rotary body, and for correcting the output of the detecting coil based on the zero-point correction value thus read.

6. A condition-monitoring apparatus for a cutting tool, comprising:

a magnetostrictive torque sensor including a core having four pillar-shaped core elements;

an exciting coil including first and second windings which are wound in opposite directions so as to generally assume a figure eight, each of the first and second windings being wound on adjacent two of the four core elements; and a detecting coil including first and second windings which are wound in opposite directions so as to generally assume a figure eight, each of the first and second windings being would on adjacent two of the four core elements, the detecting coil being oriented orthogonally to the exciting coil;

wherein the torque sensor is disposed adjacent to a rotary body whose torque is to be measured such that adjacent two of the four core elements are arranged either parallel or perpendicularly to an axial direction of the rotary body;

means for determining a condition of the cutting tool based on an output of the magnetostrictive torque sensor; and means for generating a signal for controlling a driving device on which the cutting tool is mounted based on an output of the determining means.

7. The condition-monitoring apparatus according to claim 6, wherein the condition relates to at least one of breakage and wear of the cutting tool.

8. A condition-monitoring apparatus for a cutting tool, comprising:

a magnetostrictive torque measuring apparatus including a core having four pillar-shaped core elements;

an exciting coil including first and second windings which are wound in opposite directions so as to generally assume a figure eight, each of the first and second windings being wound on adjacent two of the four core elements;

a detecting coil including first and second windings which are wound in opposite directions so as to generally assume a figure eight, each of the first and second windings being wound on adjacent two of the four core elements, the detecting coil being oriented orthogonally to the exciting coil;

wherein the torque measuring apparatus is disposed adjacent to a rotary body whose torque is to be measured such that adjacent two of the four core elements are arranged either parallel or perpendicularly to an axial direction of the rotary body; and a search coil which is wound so as to allow detection of total magnetic flux generated by the exciting coil, an output of the search coil being used to correct an output of the detecting coil;

means for storing zero-point correction data which are generated based on outputs of the search coil and the detecting coil obtained when the rotary body is rotated with no torque exerted thereon;

means for reading a zero-point correction value from the storing means based on an output of the search coil when torque is exerted on the rotary body, and for correcting the output of the detecting coil based on the zero-point correction value thus read;

means for determining a condition of the cutting tool based on an output of the magnetostrictive torque measuring apparatus; and means for generating a signal for controlling a driving device on which the cutting tool is mounted based on an output of the determining means.

9. The condition-monitoring apparatus according to claim 8, wherein the condition relates to at least one of breakage and wear of the cutting tool.

10. A condition-monitoring apparatus for a cutting tool, comprising:

a magnetostrictive torque sensor including
a core;
an exciting coil including four exciting windings which are supported by the core and are arranged at apices of an imaginary square, two adjacent ones of the four exciting windings and the other two adjacent exciting windings being wound in opposite directions; and
a detecting coil supported by the core and including four detecting windings which generally coextend with respective exciting windings;
wherein the torque sensor is disposed adjacent to a rotary body whose torque is to be measured such that adjacent two of the four exciting windings are arranged either parallel or perpendicularly to an axial direction of the rotary body;

means for determining a condition of the cutting tool based on an output of the magnetostrictive torque sensor; and means for generating a signal for controlling a driving device on which the cutting tool is mounted based on an output of the determining means.

11. The condition-monitoring apparatus according to claim 10, wherein the condition relates to at least one of breakage and wear of the cutting tool.

12. A magnetostrictive torque measuring apparatus comprising:

a magnetostrictive torque sensor including
a core;
an exciting coil including four exciting windings which are supported by the core and are arranged at apices of an imaginary square, two adjacent ones of the four exciting windings and the other two adjacent exciting windings being wound in opposite directions;
a detecting coil supported by the core and including four detecting windings which generally coextend with respective exciting windings;

wherein the torque sensor is disposed adjacent to a rotary body whose torque is to be measured such that adjacent two of the four exciting windings are arranged either parallel or perpendicularly to an axial direction of the rotary body; and a search coil which is wound so as to allow detection of total magnetic flux generated by the exciting coil, an output of the search coil being used to correct an output of the detecting coil;

means for storing zero-point correction data which are generated based on outputs of the search coil and the detecting coil obtained when the rotary body is rotated with no torque exerted thereon; and means for reading a zero-point correction value from the storing means based on an output of the search coil when torque is exerted on the rotary body, and for correcting the output of the detecting coil based on the zero-point correction value thus read.

13. A condition-monitoring apparatus for a cutting tool, comprising:

a magnetostrictive torque measuring apparatus including
a core;
an exciting coil including four exciting windings which are supported by the core and are arranged at apices of an imaginary square, two adjacent ones of the four exciting windings and the other two adjacent exciting windings being wound in opposite directions;
a detecting coil supported by the core and including four detecting windings which generally coextend with respective exciting windings;
wherein the torque measuring apparatus is disposed adjacent to a rotary body whose torque is to be measured such that adjacent two of the four exciting windings are arranged either parallel or perpendicularly to an axial direction of the rotary body; and
a search coil which is wound so as to allow detection of total magnetic flux generated by the exciting coil, an output of the search coil being used to correct an output of the detecting coil;

means for storing zero-point correction data which are generated based on outputs of the search coil and the detecting coil obtained when the rotary body is rotated with no torque exerted thereon;

means for reading a zero-point correction value from the storing means based on an output of the search coil when torque is exerted on the rotary body, and for correcting the output of the detecting coil based on the zero-point correction value thus read;

means for determining a condition of the cutting tool based on an output of the magnetostrictive torque measuring apparatus; and means for generating a signal for controlling a driving device on which the cutting tool is mounted based on an output of the determining means.

14. The condition-monitoring apparatus according to claim 13, wherein the condition relates to at least one of breakage and wear of the cutting tool.

* * * * *